US012639905B2

(12) United States Patent
Filip et al.

(10) Patent No.: US 12,639,905 B2
(45) Date of Patent: May 26, 2026

(54) INTEGRATING MEDIA CONTENT WITH A THREE-DIMENSIONAL SCENE

(71) Applicant: Google LLC, Mountain View, CA (US)

(72) Inventors: Daniel Joseph Filip, San Jose, CA (US); Charles Goran, Lafayette, CO (US)

(73) Assignee: GOOGLE LLC, Mountain View, CA (US)

( * ) Notice: Subject to any disclaimer, the term of this patent is extended or adjusted under 35 U.S.C. 154(b) by 194 days.

(21) Appl. No.: 18/564,849

(22) PCT Filed: Nov. 23, 2022

(86) PCT No.: PCT/US2022/050879
§ 371 (c)(1),
(2) Date: Nov. 28, 2023

(87) PCT Pub. No.: WO2024/112337
PCT Pub. Date: May 30, 2024

(65) Prior Publication Data
US 2025/0086915 A1      Mar. 13, 2025

(51) Int. Cl.
*G06T 19/20* (2011.01)
*G06T 19/00* (2011.01)
G06F 3/16 (2006.01)

(52) U.S. Cl.
CPC ............ *G06T 19/20* (2013.01); *G06T 19/006* (2013.01); *G06F 3/167* (2013.01); *G06T 2200/24* (2013.01); *G06T 2219/004* (2013.01); *G06T 2219/2004* (2013.01)

(58) Field of Classification Search
CPC .............................. G06T 19/006; G06T 19/20
See application file for complete search history.

(56) References Cited

U.S. PATENT DOCUMENTS

| | | | |
|---|---|---|---|
| 10,074,214 | B2 | 9/2018 | La Fleur et al. |
| 2013/0063487 | A1 | 3/2013 | Spiegel et al. |
| 2013/0222369 | A1 | 8/2013 | Huston et al. |

(Continued)

FOREIGN PATENT DOCUMENTS

| | | |
|---|---|---|
| WO | WO2022/220821 | 10/2022 |

OTHER PUBLICATIONS

Kang et al., Temporal Scene Management for Interactive Virtual Storytelling, 2006 8th International Conference Advanced Communication Technology, pp. 967-972, Feb. 2006 (Year: 2006).*

(Continued)

*Primary Examiner* — Charles Tseng
(74) *Attorney, Agent, or Firm* — DORITY & MANNING, P.A.

(57) ABSTRACT

A method for integrating media content with a three-dimensional (3D) scene to provide an immersive view of a location includes obtaining a 3D scene of the location which is generated based on a plurality of images, receiving media content temporally associated with the location, integrating at least a portion of the media content with the 3D scene of the location, and providing the integrated 3D scene of the location having the at least the portion of the media content integrated with the 3D scene of the location to represent a state of the location based on the temporal association of the media content with the location.

22 Claims, 9 Drawing Sheets

9000

9100 — RECEIVE A FIRST INPUT VIA THE INPUT DEVICE REQUESTING A FIRST IMMERSIVE VIEW OF A LOCATION WHICH REPRESENTS A FIRST STATUS OF THE LOCATION AT A FIRST TIME

9200 — PROVIDE THE FIRST IMMERSIVE VIEW OF THE LOCATION INCLUDING A 3D SCENE OF THE LOCATION WHICH IS GENERATED BASED ON A PLURALITY OF IMAGES AND FIRST MEDIA CONTENT INTEGRATED WITH THE 3D SCENE OF THE LOCATION, THE FIRST MEDIA CONTENT BEING REPRESENTATIVE OF THE FIRST STATUS OF THE LOCATION AT THE FIRST TIME

9300 — RECEIVE A SECOND INPUT VIA THE INPUT DEVICE REQUESTING A SECOND IMMERSIVE VIEW OF THE LOCATION WHICH REPRESENTS A SECOND STATUS OF THE LOCATION AT A SECOND TIME

9400 — PROVIDE THE SECOND IMMERSIVE VIEW OF THE LOCATION INCLUDING THE 3D SCENE OF THE LOCATION GENERATED BASED ON THE PLURALITY OF IMAGES AND SECOND MEDIA CONTENT INTEGRATED WITH THE 3D SCENE OF THE LOCATION, THE SECOND MEDIA CONTENT BEING REPRESENTATIVE OF THE SECOND STATUS OF THE LOCATION AT THE SECOND TIME

(56)                    References Cited

U.S. PATENT DOCUMENTS

2017/0287226 A1 *  10/2017  Du ......................... G06V 20/40
2019/0026958 A1 *   1/2019  Gausebeck ............. G06T 7/579
2022/0327785 A1    10/2022  Garcia Dorado et al.

OTHER PUBLICATIONS

Hu et al., Avatar Digitization From a Single Image For Real-Time
Rendering, ACM Transactions on Graphics, vol. 36, No. 6, Article
195, Nov. 2017 (Year: 2017).*
Anonymous, "Maps Mania: The 10 Best Sound Maps", Oct. 22,
2014, https://googlemapsmania.blogspot.com/2014/10/the-10-best-
sound-maps.htmlm=0, retrieved on Nov. 30, 2021, XP55867716.
International Search Report and Written Opinion for Application
No. PCT/US2022/050879, mailed on Apr. 11, 2023, 14 pages.
International Preliminary Report on Patentability for Application
No. PCT/US2022/050879, mailed Jun. 5, 2025, 8 pages.

* cited by examiner

3000

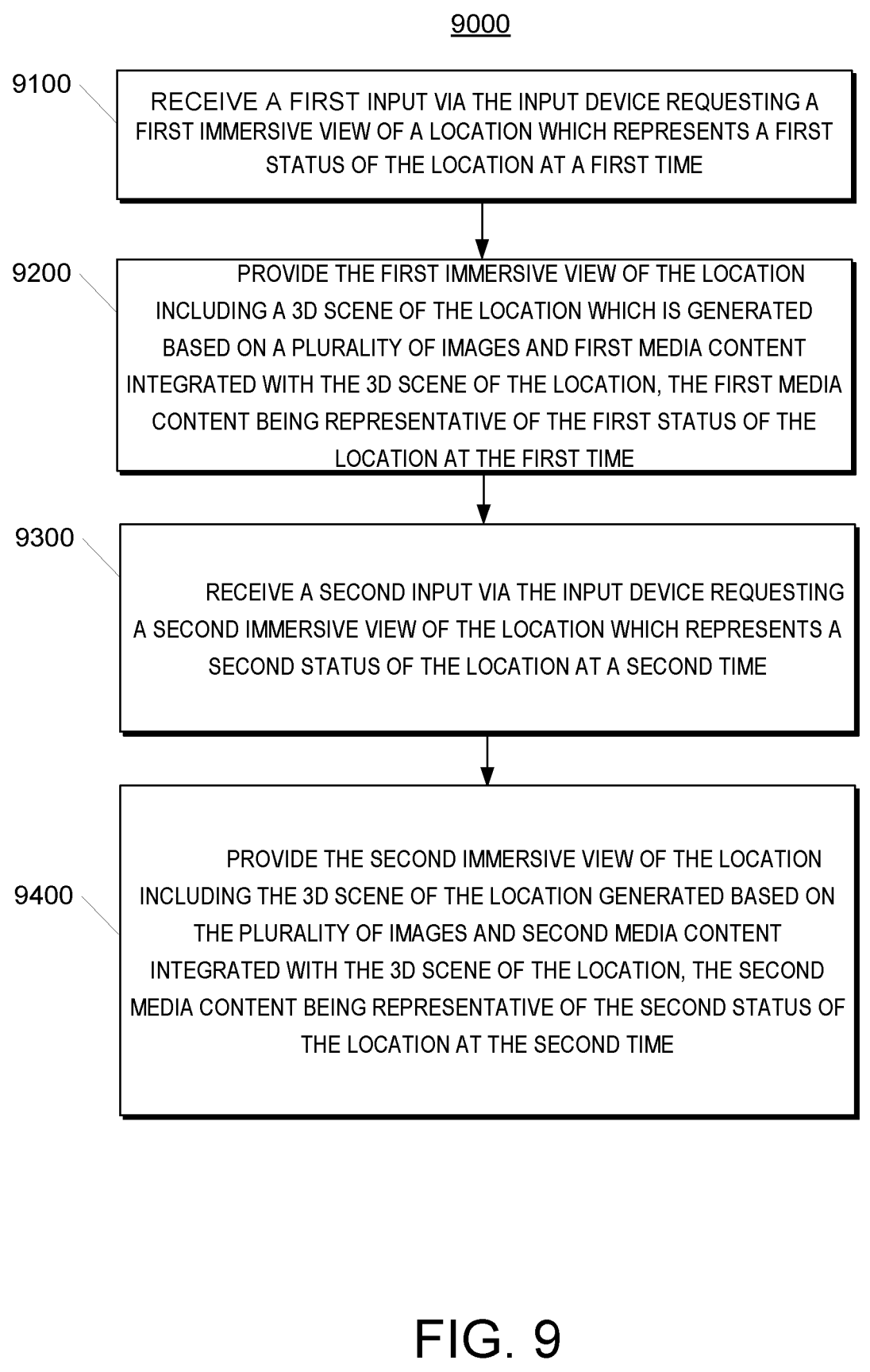

9000

9100 — RECEIVE A FIRST INPUT VIA THE INPUT DEVICE REQUESTING A FIRST IMMERSIVE VIEW OF A LOCATION WHICH REPRESENTS A FIRST STATUS OF THE LOCATION AT A FIRST TIME

9200 — PROVIDE THE FIRST IMMERSIVE VIEW OF THE LOCATION INCLUDING A 3D SCENE OF THE LOCATION WHICH IS GENERATED BASED ON A PLURALITY OF IMAGES AND FIRST MEDIA CONTENT INTEGRATED WITH THE 3D SCENE OF THE LOCATION, THE FIRST MEDIA CONTENT BEING REPRESENTATIVE OF THE FIRST STATUS OF THE LOCATION AT THE FIRST TIME

9300 — RECEIVE A SECOND INPUT VIA THE INPUT DEVICE REQUESTING A SECOND IMMERSIVE VIEW OF THE LOCATION WHICH REPRESENTS A SECOND STATUS OF THE LOCATION AT A SECOND TIME

9400 — PROVIDE THE SECOND IMMERSIVE VIEW OF THE LOCATION INCLUDING THE 3D SCENE OF THE LOCATION GENERATED BASED ON THE PLURALITY OF IMAGES AND SECOND MEDIA CONTENT INTEGRATED WITH THE 3D SCENE OF THE LOCATION, THE SECOND MEDIA CONTENT BEING REPRESENTATIVE OF THE SECOND STATUS OF THE LOCATION AT THE SECOND TIME

FIG. 9

INTEGRATING MEDIA CONTENT WITH A THREE-DIMENSIONAL SCENE

PRIORITY CLAIM

This application is based upon and claims the right of priority under 35 U.S.C. § 371 to International Application No. PCT/US2022/050879 filed on Nov. 23, 2022, which is incorporated by reference herein in its entirety for all purposes.

FIELD

The disclosure relates generally to providing an immersive view of a location. For example, the disclosure relates to methods and systems for providing an immersive view of a location by integrating previously obtained imagery with media (e.g., imagery, sound, etc.) to indicate the state of the location under various conditions.

BACKGROUND

Users capture images of points of interest including restaurants or parks using cameras or phones equipped with cameras (e.g., smartphones). Imagery of points of interest can be used to virtually navigate and experience a space, however the imagery may not provide a viewer with an accurate representation of a state of the points of interest. Additionally, the feel of the vibe or ambiance of the points of interest may not be accurate because of the lack of people or dynamic objects in the imagery.

SUMMARY

Aspects and advantages of embodiments of the disclosure will be set forth in part in the following description, or can be learned from the description, or can be learned through practice of the example embodiments.

In one or more example embodiments, a computer implemented method for integrating media content with a three-dimensional scene to provide an immersive view of a location is provided. For example, the method includes obtaining a three-dimensional (3D) scene of a location which is generated based on a plurality of images, receiving media content temporally associated with the location, integrating at least a portion of the media content with the 3D scene of the location, and providing the integrated 3D scene of the location having the at least the portion of the media content integrated with the 3D scene of the location to represent a state of the location based on the temporal association of the media content with the location.

In some implementations, the media content comprises user-generated media content captured by one or more users.

In some implementations, the user-generated media content comprises at least one of user-generated visual content or user-generated audio content.

In some implementations, the user-generated media content includes imagery of the location including one or more real-world dynamic objects, and integrating the at least the portion of the media content with the 3D scene of the location includes extracting the one or more real-world dynamic objects from the imagery of the location and determining one or more positions within the 3D scene to place the one or more real-world dynamic objects.

In some implementations, the imagery of the location including the one or more real-world dynamic objects includes first imagery of the location including a first portion of the one or more real-world dynamic objects captured at the location by the one or more users at a first time and second imagery of the location including a second portion of the one or more real-world dynamic objects captured at the location by the one or more users at a second time. Providing the 3D scene of the location having the at least the portion of the media content integrated with the 3D scene of the location may include: providing a first 3D scene of the location, associated with the first time, having the first portion of the one or more real-world dynamic objects integrated with the first 3D scene of the location, and providing a second 3D scene of the location, associated with the second time, having the second portion of the one or more real-world dynamic objects integrated with the second 3D scene of the location.

In some implementations, the user-generated media content includes first audio captured at the location by the one or more users at a first time and second audio captured at the location by the one or more users at a second time, and providing the 3D scene of the location having the at least the portion of the media content integrated with the 3D scene of the location comprises: providing a first 3D scene of the location, associated with the first time, having the first audio integrated with the first 3D scene of the location, and providing a second 3D scene of the location, associated with the second time, having the second audio integrated with the second 3D scene of the location.

In some implementations, the media content comprises machine-generated media content.

In some implementations, the machine-generated media content comprises at least one of machine-generated visual content or machine-generated audio content.

In some implementations, the machine-generated media content is synthesized based on user-generated media content captured by one or more users.

In some implementations, the user-generated media content includes imagery of the location including one or more real-world dynamic objects. In some implementations, the method further comprises: extracting the one or more real-world dynamic objects from the imagery, and converting the one or more real-world dynamic objects into corresponding graphical representations of the one or more real-world dynamic objects, and integrating the at least the portion of the media content with the 3D scene of the location includes determining one or more positions within the 3D scene to place the corresponding graphical representations of the one or more real-world dynamic objects.

In some implementations, the one or more real-world dynamic objects include one or more humans, and the corresponding graphical representations of the one or more real-world dynamic objects include corresponding 3D digital avatars of the one or more humans.

In some implementations, the imagery of the location including the one or more real-world dynamic objects includes first imagery of the location including a first portion of the one or more real-world dynamic objects captured at the location by the one or more users at a first time and second imagery of the location including a second portion of the one or more real-world dynamic objects captured at the location by the one or more users at a second time. Providing the 3D scene of the location having the at least the portion of the media content integrated with the 3D scene of the location may include: providing a first 3D scene of the location, associated with the first time, having first graphical representations corresponding to the first portion of the one or more real-world dynamic objects integrated with the first 3D scene of the location, and providing a second 3D scene of the location, associated with the second time, having second graphical representations corresponding to the second portion of the one or more real-world dynamic objects integrated with the second 3D scene of the location.

In some implementations, the user-generated media content includes first audio captured at the location by the one or more users at a first time and second audio captured at the location by the one or more users at a second time. In some implementations, the method further comprises: synthesizing a first synthesized audio recording based on the first audio and synthesizing a second synthesized audio recording based on the second audio. Providing the 3D scene of the location having the at least the portion of the media content integrated with the 3D scene of the location comprises: providing a first 3D scene of the location, associated with the first time, having the first synthesized audio recording integrated with the first 3D scene of the location, and providing a second 3D scene of the location, associated with the second time, having the second synthesized audio recording integrated with the second 3D scene of the location.

In some implementations, the method further includes synthesizing the machine-generated media content based on sensor data obtained by one or more sensors disposed at the location.

In some implementations, synthesizing the machine-generated media content based on the sensor data obtained by the one or more sensors disposed at the location comprises: determining, based on the sensor data obtained by the one or more sensors, a number of people at the location at a first time, determining, based on the sensor data obtained by the one or more sensors, features about the people at the location at the first time, generating graphical representations of the people at the location according to the number of people and according to the features about the people at the location at the first time, to indicate a state of the location at the first time, and integrating the at least the portion of the media content with the 3D scene of the location includes determining one or more positions within the 3D scene to place the graphical representations of the people.

In one or more example embodiments, a computing device (e.g., a laptop, table, smartphone, etc.) is provided. The computing device may include an input device, a display device, at least one memory to store instructions, and at least one processor configured to execute the instructions to perform operations. The operations may include: receiving a first input via the input device requesting a first immersive view of a location which represents a first state of the location at a first time, providing, for presentation on the display device, the first immersive view of the location which includes: a three-dimensional (3D) scene of the location generated based on a plurality of images, and first media content integrated with the 3D scene of the location, the first media content being representative of the first state of the location at the first time. The operations may further include receiving a second input via the input device requesting a second immersive view of the location which represents a second state of the location at a second time, and providing, for presentation on the display device, the second immersive view of the location which includes: the 3D scene of the location generated based on the plurality of images, and second media content integrated with the 3D scene of the location, the second media content being representative of the second state of the location at the second time.

In some implementations, the first media content comprises at least one of user-generated media content captured by one or more users or machine-generated media content, the user-generated media content comprises at least one of user-generated visual content or user-generated audio content, and the machine-generated media content comprises at least one of machine-generated visual content or machine-generated audio content.

In some implementations, the operations further comprise: receiving a third input, via the input device, providing user-generated media content captured by a user of the computing device, the user-generated media content being temporally associated with the first time, transmitting the user-generated media content to at least one of a server computing system configured to provide the first immersive view of the location which represents the first state of the location at the first time or a database, receiving a fourth input via the input device requesting the first immersive view of the location which represents the first state of the location at the first time, providing, for presentation on the display device, the first immersive view of the location which includes: the 3D scene of the location generated based on the plurality of images, and updated first media content integrated with the 3D scene of the location, the updated first media content being representative of the first state of the location at the first time and including at least a portion of the user-generated media content captured by the user of the computing device.

In one or more example embodiments, a server system (e.g., a server) is provided. The server system may include at least one memory to store instructions; and at least one processor configured to execute the instructions to perform operations, the operations comprising: obtaining a three-dimensional (3D) scene of a location which is generated based on a plurality of images, receiving media content temporally associated with the location, integrating at least a portion of the media content with the 3D scene of the location, and providing the 3D scene of the location having the at least the portion of the media content integrated with the 3D scene of the location to represent a state of the location based on the temporal association of the media content with the location.

In some implementations, the media content comprises at least one of user-generated media content captured by one or more users or machine-generated media content, the user-generated media content comprises at least one of user-generated visual content or user-generated audio content, and the machine-generated media content comprises at least one of machine-generated visual content or machine-generated audio content.

In one or more example embodiments, a computer-readable medium (e.g., a non-transitory computer-readable medium) which stores instructions that are executable by one or more processors of a computing system is provided. In some implementations the computer-readable medium stores instructions which may include instructions to cause the one or more processors to perform one or more operations which are associated with any of the methods described herein (e.g., operations of the server computing system and/or operations of the computing device). The computer-readable medium may store additional instructions to execute other aspects of the server computing system and computing device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which:

FIG. 9 illustrates a flow diagram of an example, non-limiting computer-implemented method, according to one or more example embodiments of the disclosure.

DETAILED DESCRIPTION

Figure 1:
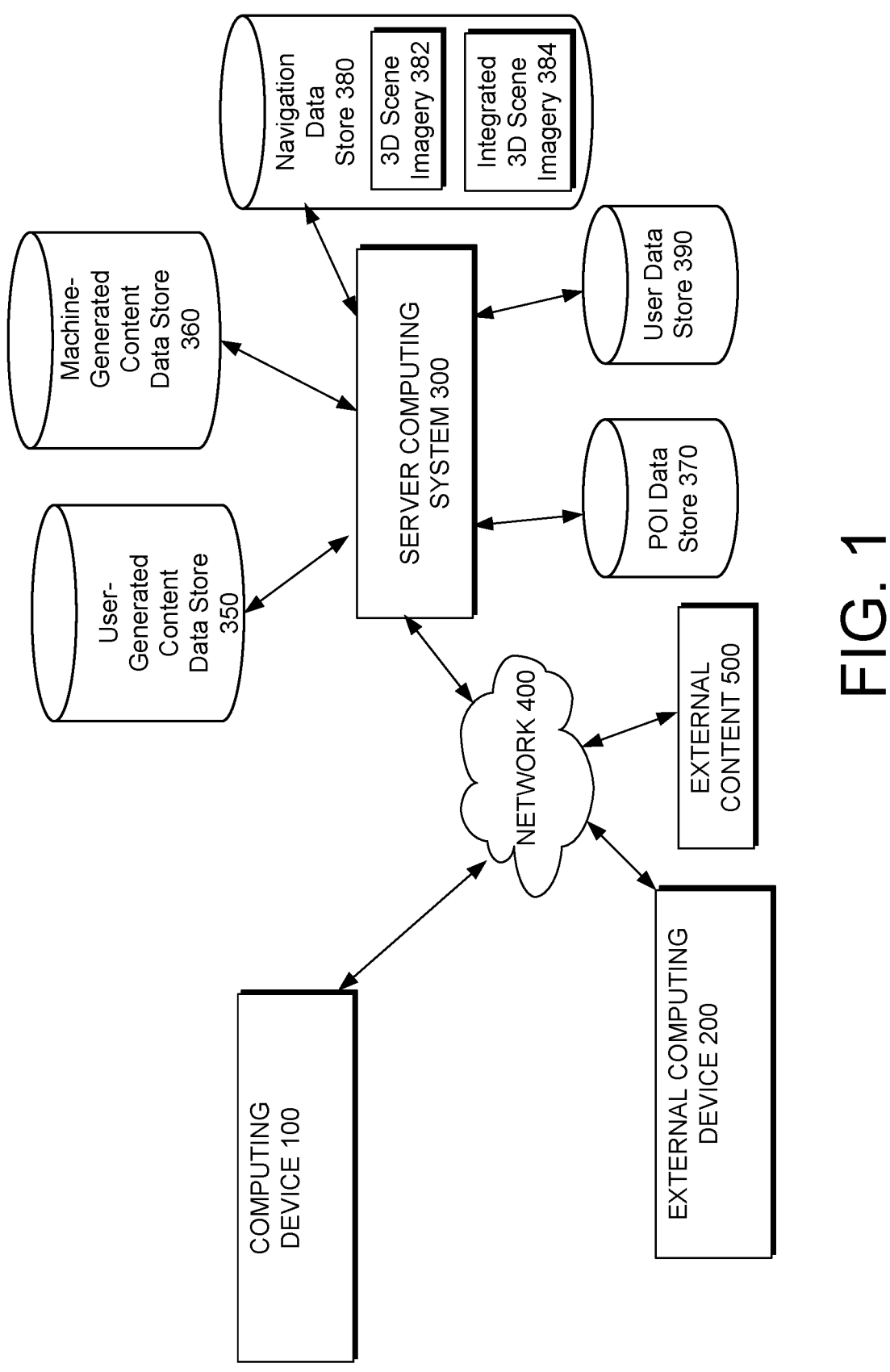
FIG. 1 depicts an example system according to according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Examples of the disclosure are directed to a computer-implemented method for integrating (e.g., embedding) media content with a three-dimensional (3D) scene of a location to represent a state of the location based on the temporal association of the media content with the location. For example, the state of the location under specified conditions (e.g., a particular time, a particular weather condition, etc.) may include the number of people at the location (e.g., crowded, empty, etc.), a state of the atmosphere generally (e.g., vivacious and lively, subdued, etc.), an expected attire (e.g., formal wear, trendy, casual, sports attire, etc.), a noise level (e.g., peaceful, rowdy, etc.).

According to example embodiments a navigation and mapping system may include an immersive view application to provide a user of a computing device a way to explore a location through multi-dimensional views of an area or point-of-interest including landmarks, restaurants, and the like. The immersive view application may be part of a navigation application or a separate mapping application, or may be a standalone application. The immersive view may include an integrated 3D scene of a location in which the integrated 3D scene of the location is formed by integrating media content with an original or preexisting 3D scene of the location. The media content integrated with the 3D scene of the location may be temporally associated with the location such that the integrated 3D scene provides an accurate representation of the state of the location at a particular time or under other specified conditions. Additionally, a vibe or feeling of the location at a particular time may also be more accurately represented. In some implementations, the media content may be associated with the location in other aspects, including environmental aspects including weather conditions, lighting conditions, and the like.

According to examples of the disclosure, a server computing system may provide the integrated 3D scene of a location to a computing device for presentation on a display device of the computing device. The integrated 3D scene of the location may be provided dynamically (e.g., generated and transmitted in response to a request from the computing device), or the integrated 3D scene of the location may be provided by retrieving the integrated 3D scene of the location from a database. The integrated 3D scene of the location may be retrieved from the database according to conditions of the request. For example, if a user requests an immersive view of a restaurant at 6 pm on a Friday, the server computing system may retrieve the integrated 3D scene of the location from the database which substantially matches the conditions input by the user (e.g., an immersive view of the restaurant at a particular time).

The integrated 3D scene of the location may be generated by the server computing system by integrating media content which can include user-generated media content, machine-generated media content, or combinations thereof. For example, the user-generated media content may include imagery of a location including one or more real-world dynamic objects (e.g., people, animals, vehicles, and the like). The server computing system may be configured to integrate at least a portion of the media content with the 3D scene of the location by extracting the one or more real-world dynamic objects from the imagery of the location and determining one or more positions within the 3D scene to place the one or more real-world dynamic objects. For example, the server computing system can extract the dynamic objects via known image analysis techniques including image segmentation, and may identify locations within the 3D scene to appropriate place the real-world dynamic objects.

In some implementations, the imagery of the location including the one or more real-world dynamic objects includes first imagery of the location including a first portion of the one or more real-world dynamic objects captured at the location by one or more users (e.g., one or more computing devices) at a first time and second imagery of the location including a second portion of the one or more real-world dynamic objects captured at the location by the one or more users (e.g., one or more computing devices) at a second time. That is, user-generated media content may include imagery with different temporal associations (e.g., imagery captured in the morning, in the middle of the day, at night, etc.).

The server computing system may be configured to generate and provide a first 3D scene of the location, associated with the first time, having the first portion of the one or more real-world dynamic objects integrated with the first 3D scene of the location, and to generate and provide a second 3D scene of the location, associated with the second time, having the second portion of the one or more real-world dynamic objects integrated with the second 3D scene of the location.

In some implementations, the user-generated media content includes first audio captured at the location by one or more users (e.g., one or more computing devices) at a first time and second audio captured at the location by the one or more users (e.g., one or more computing devices) at a second time. That is, user-generated media content may include audio content with different temporal associations (e.g., audio captured or recorded in the morning, in the middle of the day, at night, etc.). For example, the user-generated media content may include audio content with different environmental associations (e.g., audio captured or recorded in sunny conditions, in rainy conditions, in windy conditions, etc.).

The server computing system may be configured to generate and provide a first 3D scene of the location, associated with the first time, having the first audio integrated with the first 3D scene of the location, and to generate and provide a second 3D scene of the location, associated with the second time, having the second audio integrated with the second 3D scene of the location.

In some implementations, the media content integrated with the 3D scene of the location may include machine-generated media content. For example, the user-generated media content may include imagery of a location including one or more real-world dynamic objects. The server computing system may be configured to extract the one or more real-world dynamic objects from the imagery and to convert the one or more real-world dynamic objects into corresponding graphical representations of the one or more real-world dynamic objects (i.e., into machine-generated media content). Extracting real-world dynamic objects from the imagery may comprise identifying an object type or characteristic of the real-world dynamic object in order to identify a corresponding graphical representation of the real-world dynamic object in a quick and efficient manner. In another implementation, the server computing system may be configured to first convert the imagery into a corresponding graphical representation and to extract the graphical representations of the one or more real-world dynamic objects. The server computing system may be configured to integrate the graphical representation of the one or more real-world dynamic objects with the 3D scene of the location by determining one or more positions within the 3D scene to place the corresponding graphical representations of the one or more real-world dynamic objects. By using graphical representations of real-world dynamic objects, the integration with the 3D scene may be achieved more quickly and efficiently as the system need only identify a type or characteristic of the real-world dynamic object (e.g. person) in order to generate an appropriate and accurate graphical representation. Such a graphical representation thus provides an accurate prediction of the state of the location.

In some implementations, the one or more real-world dynamic objects include one or more humans (e.g. an object type being "human"), and the corresponding graphical representations of the one or more real-world dynamic objects include corresponding 3D digital avatars of the one or more humans.

In some implementations, the user-generated media content includes first audio captured at the location by one or more users (e.g., one or more computing devices) at a first time and second audio captured at the location by the one or more users (e.g., one or more computing devices) at a second time. The server computing system may be configured to convert the first audio and/or the second audio into synthesized audio (i.e., into machine-generated media content). Converting audio to synthesized audio may comprise identifying an audio type or characteristic of the audio in order to identify a corresponding synthesized audio in a quick and efficient manner. Such a synthesized audio thus provides an accurate prediction of the state of a location. For example, the server computing system may be configured to synthesize a first synthesized audio recording based on the first audio and synthesize a second synthesized audio recording based on the second audio. The server computing system may be configured to generate and provide a first 3D scene of the location, associated with the first time, having the first synthesized audio recording integrated with the first 3D scene of the location, and generate and provide a second 3D scene of the location, associated with the second time, having the second synthesized audio recording integrated with the second 3D scene of the location. By using synthesized audio instead of the captured audio itself, the integration with the 3D scene may be achieved more quickly as the system need only identify a type or characteristic of the captured audio (e.g. a genre) in order to generate an appropriate and accurate synthesized audio representation of the actual audio.

In some implementations, the server computing system may be configured to synthesize the machine-generated media content based on sensor data obtained by one or more sensors disposed at the location associated with the 3D scene. For example, the server computing system may be configured to, based on the sensor data obtained by the one or more sensors, determine a number of people at the location at a first time, determine, based on the sensor data obtained by the one or more sensors, features about the people at the location at the first time, and generate graphical representations of the people at the location according to the number of people and according to the features about the people at the location at the first time, to indicate an accurate representation of the state of the location at the first time, and then integrate the graphical representations of the people at the location with the 3D scene of the location by determining one or more positions within the 3D scene to place the graphical representations of the people. For example, sensor data may indicate the presence of twenty people within a restaurant and imagery may indicate that formal attire is being worn at the restaurant or external content obtained from web pages associated with the restaurant may indicate that formal attire is required at the restaurant. Therefore, the server computing system may be configured to generate graphical representations of the people at the restaurant according to the number of people (approximately twenty) and according to known or predicted features about the people at the location at the first time (e.g., wearing formal attire), to accurately represent the state of the location at the first time. For example, the server computing system can then integrate the graphical representations of the people at the restaurant with the 3D scene of the restaurant by determining one or more positions within the 3D scene to place the graphical representations of the people (e.g., at tables, at a bar, etc.).

One or more technical benefits of the disclosure include allowing users to easily and more accurately obtain an accurate representation of a state of a location under particular circumstances or conditions. For example, a user can easily and more accurately obtain an accurate representation of a state of an indoor or outdoor venue including a restaurant or park at a particular time of day, time of day, time of year, etc. For example, a user can easily and more accurately obtain an accurate representation of a state of an indoor or outdoor venue including a restaurant or park under certain environmental conditions (e.g., when it is sunny, when it is rainy, when it is windy, etc.). Due to the above methods, users are provided with an accurate representation of a state of a location, virtually and via a display, without needing to travel to the location in person. Further, the user may also be provided with an accurate prediction of the state of a location at a certain time or under certain conditions, as defined by the user.

One or more technical benefits of the disclosure also include integrating fresh media content (e.g., user-generated media content and/or machine-generated media content) associated with a location with a preexisting 3D scene of a location. For example, the media content may be obtained subsequent to imagery which is used to form the 3D model forming the 3D scene of the location. Therefore, the integrated 3D scene represents an accurate and updated state of the location. Furthermore, various integrated 3D scenes may be generated to accurately portray the location according to various conditions. For example, the server computing system is configured to select media content for integration based on information associated with the media content that matches the request of the user for an immersive view. For example, images of the interior of a restaurant taken in the morning when few customers are present would not be integrated in an integrated 3D scene which is generated for an immersive view of the restaurant at dinner. Therefore, the use of metadata and other descriptive content associated with the media content may be used to form the integrated 3D scene of the location in an accurate manner. Likewise, image segmentation techniques and machine learning resources may be implemented to position or place dynamic objects extracted from media content in suitable locations within the integrated 3D scene of the location, so as to provide a state of the location in an accurate manner.

Thus, according to aspects of the disclosure, technical benefits such as resource savings and immersive view accuracy improvements may be achieved.

Referring now to the drawings, FIG. 1 is an example system according to one or more example embodiments of the disclosure. FIG. 1 illustrates an example of a system which includes a computing device 100, an external computing device 200, a server computing system 300, and external content 500, which may be in communication with one another over a network 400. For example, the computing device 100 and the external computing device 200 can include any of a personal computer, a smartphone, a tablet computer, a global positioning service device, a smartwatch, and the like. The network 400 may include any type of communications network including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

As will be explained in more detail below, in some implementations the computing device 100 and/or server computing system 300 may form part of a navigation and mapping system which can provide an immersive view of a location to a user of the computing device 100.

In some example embodiments, the server computing system 300 may obtain data from one or more of a user-generated content data store 350, a machine-generated content data store 360, a POI data store 370, a navigation data store 380, and a user data store 390, to implement various operations and aspects of the navigation and mapping system as disclosed herein. The user-generated content data store 350, machine-generated content data store 360, POI data store 370, navigation data store 380, and user data store 390 may be integrally provided with the server computing system 300 (e.g., as part of the one or more memory devices 320 of the server computing system 300) or may be separately (e.g., remotely) provided. Further, user-generated content data store 350, machine-generated content data store 360, POI data store 370, navigation data store 380, and user data store 390 can be combined as a single data store (database), or may be a plurality of respective data stores. Data stored in one data store (e.g., the POI data store 370)

may overlap with some data stored in another data store (e.g., the navigation data store 380). In some implementations, one data store (e.g., the machine-generated content data store 360) may reference data that is stored in another data store (e.g., the user-generated content data store 350).

User-generated content data store 350 can store media content which is captured by a user, for example, via computing device 100, external computing device 200, or some other computing device. The user-generated media content may include user-generated visual content and/or user-generated audio content. For example, the media content may be captured by a person operating the computing device or may be captured indirectly, for example, by a computing system that monitors a location (e.g., a security system, surveillance system, and the like).

For example, the media content may be captured by a camera (e.g., image capturer 182) of a computing device, and may include imagery of a location including a restaurant, a landmark, a business, a school, and the like. The imagery may include various information (e.g., metadata, semantic data, etc.) which is useful for integrating the imagery (or portions of the imagery) in a 3D scene of a location associated with the imagery. For example, an image may include information including a date the image was captured, a time of day the image was captured, and location information indicating the location where the image was taken (e.g., a GPS location), etc. For example, descriptive metadata may be provided with the image and may include keywords relating to the image, a title or name of the image, environmental information at the time the image was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device used to capture the image or from another computing device.

For example, the media content may be captured by a microphone (e.g., sound capturer 184) of a user computing device, and may include audio associated with a location including a restaurant, a landmark, a business, a school, and the like. The audio content may include various information (e.g., metadata, semantic data, etc.) which is useful for integrating the audio content (or portions of the audio) with a 3D scene of a location associated with the audio content. For example, the audio content may include information including a date the audio was captured, a time of day the audio was captured, and location information indicating the location where the audio was captured (e.g., a GPS location), etc. For example, descriptive metadata may be provided with the audio and may include keywords relating to the audio, a title or name of the audio, environmental information at the time the audio was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device used to capture the audio or from another computing device.

Machine-generated content data store 360 can store machine-generated media content which can be generated by the server computing system 300 (e.g., machine-generated content generator 340), for example, or some other computing device. The machine-generated media content may include machine-generated visual content and/or machine-generated audio content. For example, the machine-generated content stored at machine-generated content data store 360 may be generated based on user-generated media content captured by one or more users of computing devices and/or based on synthesized media content which is created by the machine-generated content generator 340 of the server computing system 300 or some other computing device.

In some implementations the machine-generated content stored at machine-generated content data store 360 may be generated by the machine-generated content generator 340 by converting the user-generated media content to a generic form to anonymize the media content (e.g., by converting a real-world image of a person positioned at a location to a two-dimensional or three-dimensional digital avatar which represents the person).

In some implementations machine-generated content stored at machine-generated content data store 360 may be generated by the machine-generated content generator 340 based on sensor data obtained by one or more sensors (which may form part of external content 500) disposed at a location. For example, the sensor data obtained by the one or more sensors may indicate how many people are present at a location (e.g., based on the number of smartphones or other computing devices detected at the location). For example, the sensor data obtained by the one or more sensors may indicate various features about the people at the location (e.g., clothing, facial expressions, etc. based on an image captured by a camera, for example). For example, image synthesizer 342 may generate graphical representations of the people at the location according to the number of people and according to the features about the people at the location, to accurately represent the state of the location. As previously mentioned, the generation of such graphical representations may be based on identifying an object type or characteristic. For example, on determining that the sensor data indicates the object is a person, a graphical representation of a human may be generated. As another example, the sensor data may indicate that the object is a person wearing a hat, in which case a graphical representation of a human wearing a hat may be generated.

In some implementations the machine-generated content stored at machine-generated content data store 360 may be generated by the machine-generated content generator 340 by creating new media content based on a portion of the user-generated media content. For example, audio synthesizer 344 may generate audio content based on a portion (e.g., granular information) of recorded user-generated audio content or other available sound to create new audio content that remains representative of the mood, atmosphere, vibe, or feeling of the location at a particular time (e.g., time of day, time of week, time of year, etc.). As previously mentioned, the generation of audio content may be based on identifying an audio type or characteristic of the portion of recorded user-generated audio content or other available sound. For example, the user-generated audio content may have an audio type of "country music", in which case the generated audio content may also be country music in order to accurately represent the state of the location.

POI data store 370 can store information about locations or points-of-interest, for example, for points-of-interest in an area or region associated with one or more geographic areas. A point-of-interest may include any destination or place. For example, a point-of-interest may include a restaurant, museum, sporting venue, concert hall, amusement park, school, place of business, grocery store, gas station, theater, shopping mall, lodging, and the like. Point-of-interest data which is stored in the POI data store 370 may include any information which is associated with the POI. For example, the POI data store 370 may include location information for the POI, hours of operation for the POI, a phone number for the POI, reviews concerning the POI, financial information associated with the POI (e.g., the average cost for a service provided and/or goods sold at the POI such as a meal, a ticket, a room, etc.), environmental information concerning the POI (e.g., a noise level, an ambiance description, a traffic level, etc., which may be provided or available in real-time by various sensors located at the POI), a description of the types of services provided and/or goods sold, languages spoken at the POI, a URL for the POI, image content associated with the POI, etc. For example, information about the POI may be obtainable from external content 500 (e.g., from webpages associated with the POI or from sensors disposed at the POI).

Navigation data store 380 may store or provide map data/geospatial data to be used by server computing system 300. Example geospatial data includes geographic imagery (e.g., digital maps, satellite images, aerial photographs, street-level photographs, synthetic models, etc.), tables, vector data (e.g., vector representations of roads, parcels, buildings, etc.), point of interest data, or other suitable geospatial data associated with one or more geographic areas. In some examples, the map data can include a series of sub-maps, each sub-map including data for a geographic area including objects (e.g., buildings or other static features), paths of travel (e.g., roads, highways, public transportation lines, walking paths, and so on), and other features of interest. Navigation data store 380 can be used by server computing system 300 to provide navigational directions, perform point of interest searches, provide point of interest location or categorization data, determine distances, routes, or travel times between locations, or any other suitable use or task required or beneficial for performing operations of the example embodiments as disclosed herein.

For example, the navigation data store 380 may store 3D scene imagery 382 which includes images associated with generating 3D scenes of various locations. In an example, a 3D scene generator 336 may be configured to generate a 3D scene based on a plurality of images of a location (e.g., of the inside of a restaurant, of a park, etc.). The plurality of images may be captured and combined using known methods to create a 3D scene of the location. For example, images which overlap with one another may be stitched together to create a 3D model of the scene. In some implementations, a method including a structure from motion algorithm can be used to estimate a three-dimensional structure. In some implementations, a machine learning resource may be implemented to generate a camera-like image from any viewpoint within the location based on the captured images. For example, video flythroughs of the location may be generated based on the captured images. In some implementations, the initial 3D scene generated by the 3D scene generator 336 may be a static 3D scene which is devoid of variable or dynamic (e.g., moving) objects. For example, the initial 3D scene of a park may include imagery of the park including imagery of trees, playground equipment, picnic tables, and the like, without imagery of humans, dogs, or non-static objects. User generated content may include imagery of the variable or dynamic objects, where the imagery may be associated with different times and/or conditions (e.g., different times of the day, week, or year, different lighting conditions, different environmental conditions, etc.).

For example, the navigation data store 380 may store integrated 3D scene imagery 384 which includes 3D scenes of various locations with which media content is integrated. In an example, a 3D scene integrator 338 may be configured to integrate user-generated content from user-generated content data store 350 and/or machine-generated content from machine-generated content data store 360 with a 3D scene obtained from 3D scene imagery 382. For example, the integrated 3D scene imagery 384 may include 3D scenes of various locations with which media content is integrated. The 3D scene generated based on the plurality of images of the location may be integrated with the media content using known methods to create the integrated 3D scene imagery 384 of the location. For example, the 3D scene integrator 338 may be configured to identify and extract one or more objects (e.g., one or more dynamic objects) from an image of a scene. For example, the 3D scene integrator 338 may be configured to position or place the extracted one or more objects within a 3D scene that is associated with the extracted one or more objects. For example, the 3D scene integrator 338 may select a 3D scene from 3D scene imagery 382 which corresponds to the image of the scene having the one or more objects. For example, the 3D scene integrator 338 may select a 3D scene from 3D scene imagery 382 which has the greatest degree of similarity to the image of the scene having the one or more objects (e.g., in terms of a time of day, time of year, weather conditions, lighting conditions, etc.). For example, a user-generated image taken at a park at noon in sunny conditions may include several children playing on playground equipment. The 3D scene integrator 338 may be configured to extract the children from the image using various techniques (e.g., image segmentation algorithms, machine learning resources, cropping tools, etc.). The 3D scene integrator 338 may be configured to select a 3D scene from 3D scene imagery 382 having features similar to the image (e.g., a similar time of day, time of year, sunny conditions, etc.). The 3D scene integrator 338 may be configured to position the extracted images of the children within the 3D scene to generate an updated or integrated 3D scene in which the children are placed in the scene (e.g., on a slide, on a see saw, etc.), so as to provide a user viewing the integrated 3D scene with an accurate representation of the state of the park at that time of day, as well as a sense of how the park generally feels at that time of day, for example in similar weather conditions. In some implementations, audio content may also be integrated with the 3D scene. For example, 3D scene integrator 338 may be configured to integrate sound with the 3D scene in a manner similar to integrating imagery. For example, audio recorded at the park at noon may include the laughter of children while audio recorded at the park at night may include the sound of wildlife. 3D scene integrator 338 may be configured to integrate the sound of laughter (e.g., using an actual recording taking into account privacy considerations or permissions of the user or a machine-generated audio that includes synthesized laughter) with the 3D scene which is associated with the similar timeframe of the audio. For example, the integrated 3D scene in which the children are placed in the scene (e.g., on the slide, on the see saw, etc.) and having the audio content which is played while a user views the immersive view, provides the user viewing the integrated 3D scene with an accurate representation of the state of the 3D scene at that time as day, as well as an increased sense of how the park generally feels at that time of day, for example in similar weather and noise conditions.

Media content including user-generated content and/or machine-generated content may include audio content and/ or imagery of variable or dynamic objects, where the audio content and imagery may be associated with different times and/or conditions (e.g., different times of the day, week, or year, different lighting conditions, different environmental conditions, etc.). The 3D scene integrator 338 may be configured to integrate the user-generated content and/or machine-generated content with the initial 3D scene generated by 3D scene generator 336, for example, according to temporal information associated with the media content. For example, a first integrated 3D scene of a location may be associated with a first time (e.g., a first time of day, first time of year, etc.) based on media content captured at the first time or relating to the first time and a second integrated 3D scene of the location may be associated with a second time (e.g., a second time of day, second time of year, etc.) based on media content captured at the second time or relating to the second time.

In some example embodiments, the user data store 390 can represent a single database. In some embodiments, the user data store 390 represents a plurality of different databases accessible to the server computing system 300. In some examples, the user data store 390 can include a current user position and heading data. In some examples, the user data store 390 can include information regarding one or more user profiles, including a variety of user data such as user preference data, user demographic data, user calendar data, user social network data, user historical travel data, and the like. For example, the user data store 390 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. According to one or more examples of the disclosure, the data can be analyzed to determine preferences of the user with respect to a POI, for example, to automatically suggest or automatically provide an immersive view of a location that is preferred by the user, where the immersive view is associated with a time that is also preferred by the user (e.g., providing an immersive view of a park in the evening where the user data indicates the park is a favorite POI of the user and that the user visits the park most often during the evening). The data can be analyzed to determine preferences of the user with respect to a POI, for example, to determine preferences of the user with respect to traveling (e.g., a mode of transportation, an allowable time for traveling, etc.), to determine possible recommendations for POIs for the user, to determine possible travel routes and modes of transportation for the user to a POI, and the like.

The user data store 390 is provided to illustrate potential data that could be analyzed, in some embodiments, by the server computing system 300 to identify user preferences, to recommend POIs, to determine possible travel routes to a POI, to determine modes of transportation to be used to travel to a POI, to determine immersive views of locations to provide to a computing device associated with the user, etc. However, such user data may not be collected, used, or analyzed unless the user has consented after being informed of what data is collected and how such data is used. Further, in some embodiments, the user can be provided with a tool (e.g., in a navigation application or via a user account) to revoke or modify the scope of permissions. In addition, certain information or data can be treated in one or more ways before it is stored or used, so that personally identifiable information is removed or stored in an encrypted fashion. Thus, particular user information stored in the user data store 390 may or may not be accessible to the server computing system 300 based on permissions given by the user, or such data may not be stored in the user data store 390 at all.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The computing device 100, external computing device 200, and server computing system 300 can access external content 500 over network 400. External content 500 can be searched by computing device 100, external computing device 200, and server computing system 300 according to known searching methods and search results can be ranked according to relevance, popularity, or other suitable attributes, including location-specific filtering or promotion.

Figure 2:
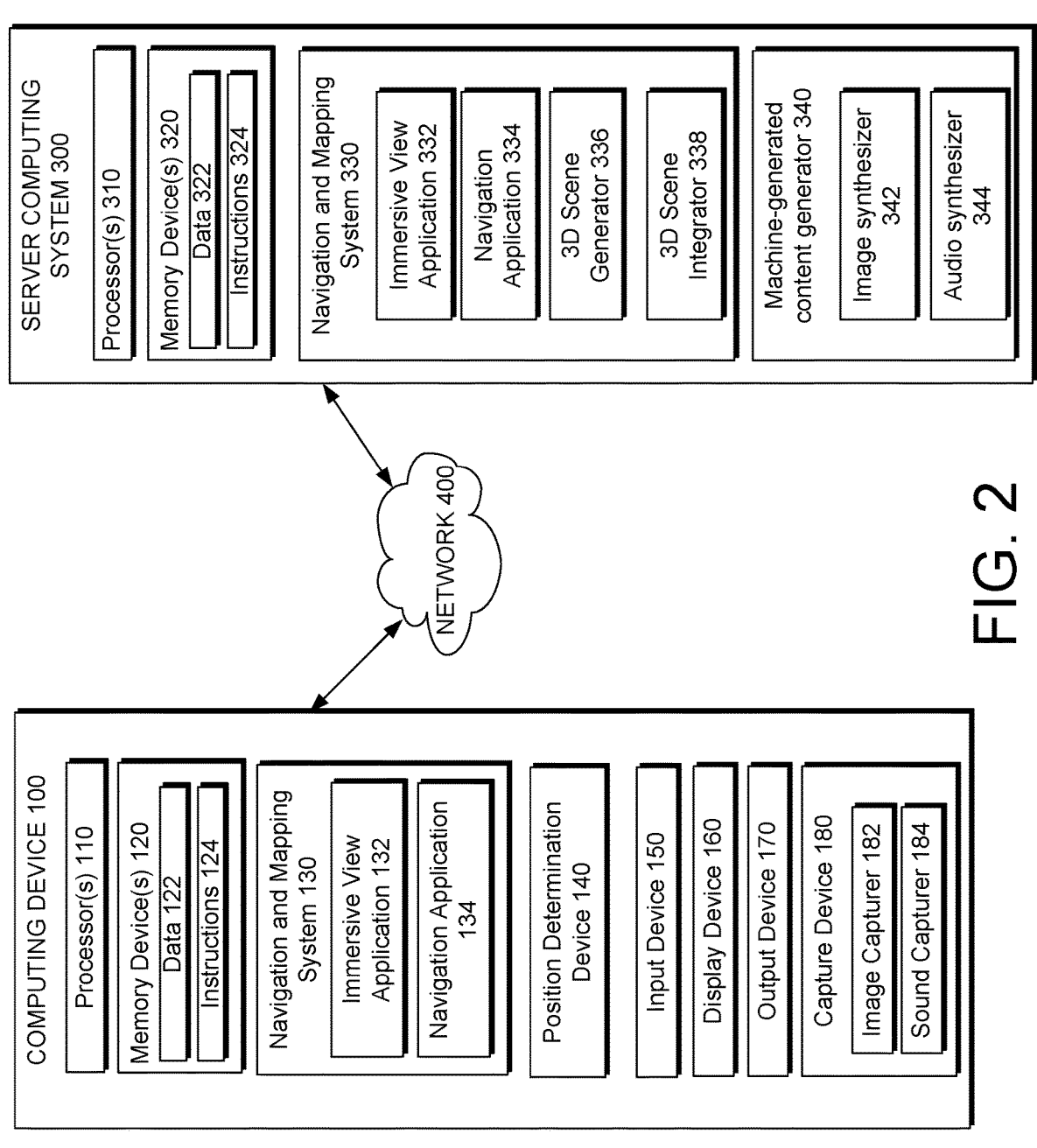
FIG. 2 depicts example block diagrams of a computing device and a server computing system according to one or more example embodiments of the disclosure.

Referring now to FIG. 2, example block diagrams of a computing device and server computing system according to one or more example embodiments of the disclosure will now be described. Although computing device 100 is represented in FIG. 2, features of the computing device 100 described herein are also appliable to the external computing device 200.

The computing device 100 may include one or more processors 110, one or more memory devices 120, a navigation and mapping system 130, a position determination device 140, an input device 150, a display device 160, an output device 170, and a capture device 180. The server computing system 300 may include one or more processors 310, one or more memory devices 320, a navigation and mapping system 330, and a machine-generated content generator 340.

For example, the one or more processors 110, 310 can be any suitable processing device that can be included in a computing device 100 or server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to execute an immersive view application 132, and to execute the instructions to perform operations including: receiving a first input via the input device 150 requesting a first immersive view of a location which represents a first state of the location at a first time, and providing, for presentation on the display device 160, the first immersive view of the location which includes: a three-dimensional (3D) scene of the location generated based on a plurality of images, and first media content integrated with the 3D scene of the location, the first media content being representative of the first state of the location at the first time. The operations may further include: receiving a second input via the input device 150 requesting a second immersive view of the location which represents a second state of the location at a second time, and providing, for presentation on the display device 160, the second immersive view of the location which includes: the 3D scene of the location generated based on the plurality of images, and second media content integrated with the 3D scene of the location, the second media content being representative of the second state of the location at the second time, as described according to examples of the disclosure.

One or more memory devices 120 can also include data 122 and instructions 124 that can be retrieved, manipulated, created, or stored by the one or more processors 110. In some example embodiments, such data can be accessed and used as input to implement immersive view application 132, and to execute the instructions to perform operations including: receiving a first input via the input device 150 requesting a first immersive view of a location which represents a first state of the location at a first time, and providing, for presentation on the display device 160, the first immersive view of the location which includes: a three-dimensional (3D) scene of the location generated based on a plurality of images, and first media content integrated with the 3D scene of the location, the first media content being representative of the first state of the location at the first time. The operations may further include: receiving a second input via the input device 150 requesting a second immersive view of the location which represents a second state of the location at a second time, and providing, for presentation on the display device 160, the second immersive view of the location which includes: the 3D scene of the location generated based on the plurality of images, and second media content integrated with the 3D scene of the location, the second media content being representative of the second state of the location at the second time, as described according to examples of the disclosure.

In some example embodiments, the computing device 100 includes a navigation and mapping system 130. For example, the navigation and mapping system 130 may include an immersive view application 132 and a navigation application 134.

According to examples of the disclosure, the immersive view application 132 may be executed by the computing device 100 to provide a user of the computing device 100 a way to explore a location through multi-dimensional views of an area or point-of-interest including landmarks, restaurants, and the like. In some implementations, the immersive view application 132 may provide a video flythrough of a location to provide a user an inside of view of a location. The immersive view application 132 may be part of navigation application 134 or a separate mapping application, or may be a standalone application.

In some examples, one or more aspects of the immersive view application 132 may be implemented by the immersive view application 332 of the server computing system 300 which may be remotely located, to provide a requested immersive view. In some examples, one or more aspects of the immersive view application 332 may be implemented by the immersive view application 132 of the computing device 100, to generate a requested immersive view.

According to examples of the disclosure, the navigation application 134 may be executed by the computing device 100 to provide a user of the computing device 100 a way to navigate to a location. The navigation application 134 can provide navigation services to a user. In some examples, the navigation application 134 can facilitate a user's access to a server computing system 300 that provides navigation services. In some example embodiments, the navigation services include providing directions to a specific location such as a POI. For example, a user can input a destination location (e.g., an address or a name of a POI). In response, the navigation application 134 can, using locally stored map data for a specific geographic area and/or map data provided via the server computing system 300, provide navigation information allowing the user to navigate to the destination location. For example, the navigation information can include turn-by-turn directions from a current location (or a provided origin point or departure location) to the destination location. For example, the navigation information can include a travel time (e.g., estimated or predicted travel time) from a current location (or a provided origin point or departure location) to the destination location.

The navigation application 134 can provide, via a display device 160 of the computing device 100, a visual depiction of a geographic area. The visual depiction of the geographic area may include one or more streets, one or more points of interest (including buildings, landmarks, and so on), and a highlighted depiction of a planned route. In some examples, the navigation application 134 can also provide location-based search options to identify one or more searchable points of interest within a given geographic area. In some examples, the navigation application 134 can include a local copy of the relevant map data. In other examples, the navigation application 134 may access information at server computing system 300 which may be remotely located, to provide the requested navigation services.

In some examples, the navigation application 134 can be a dedicated application specifically designed to provide navigation services. In other examples, the navigation application 134 can be a general application (e.g., a web browser) and can provide access to a variety of different services including a navigation service via the network 400.

In some example embodiments, the computing device 100 includes a position determination device 140. Position determination device 140 can determine a current geographic location of the computing device 100 and communicate such geographic location to server computing system 300 over network 400. The position determination device 140 can be any device or circuitry for analyzing the position of the computing device 100. For example, the position determination device 140 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining a position of the computing device 100.

The computing device 100 may include an input device 150 configured to receive an input from a user and may include, for example, one or more of a keyboard (e.g., a physical keyboard, virtual keyboard, etc.), a mouse, a joy-stick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), an output sound device (e.g., a speaker), a track ball, a remote controller, a portable (e.g., a cellular or smart) phone, a tablet PC, a pedal or footswitch, a virtual-reality device, and so on. The input device 150 may further include a haptic device to provide haptic feedback to a user. The input device 150 may also be embodied by a touch-sensitive display having a touchscreen capability, for example. For example, the input device 150 may be configured to receive an input from a user associated with the input device 150.

The computing device 100 may include a display device 160 which displays information viewable by the user (e.g., a map, an immersive view of a location, a user interface screen, etc.). For example, the display device 160 may be a non-touch sensitive display or a touch-sensitive display. The display device 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 160 can be used by the navigation and mapping system 130 installed on the computing device 100 to display information to a user relating to an input (e.g., information relating to a location of interest to the user, a user interface screen having user interface elements which are selectable by the user, etc.). Navigational information can include, but is not limited to, one or more of a map of a geographic area, an immersive view of a location (e.g., a three-dimensional immersive view, a fly-through immersive view of a location, etc.), the position of the computing device 100 in the geographic area, a route through the geographic area designated on the map, one or more navigational directions (e.g., turn-by-turn directions through the geographic area), travel time for the route through the geographic area (e.g., from the position of the computing device 100 to a POI), and one or more points-of-interest within the geographic area.

The computing device 100 may include an output device 170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. According to various examples of the disclosure, the output device 170 may include a speaker which outputs sound which is associated with a location in response to a user requesting an immersive view of a location.

The computing device 100 may include a capture device 180 that is capable of capturing media content, according to various examples of the disclosure. For example, the capture device 180 can include an image capturer 182 (e.g., a camera) which is configured to capture images (e.g., photos, video, and the like) of a location. For example, the capture device 180 can include a sound capturer 184 (e.g., a microphone) which is configured to capture sound or audio (e.g., an audio recording) of a location. The media content captured by the capture device 180 may be transmitted to one or more of the server computing system 300, user-generated content data store 350, machine-generated content data store

360, POI data store 370, navigation data store 380, and user data store 390, for example, via network 400. For example, in some implementations imagery may be used to generate a 3D scene and in some implementations the media content can be integrated with an existing 3D scene.

In accordance with example embodiments described herein, the server computing system 300 can include one or more processors 310 and one or more memory devices 320 which were previously discussed above. The server computing system 300 may also include a navigation and mapping system 330 and a machine-generated content generator 340.

For example, the navigation and mapping system 330 may include an immersive view application 332 which performs functions similar to those discussed above with respect to immersive view application 132.

For example, the navigation and mapping system 330 may include a 3D scene generator 336 which is configured to generate a 3D scene based on a plurality of images of a location (e.g., of the inside of a restaurant, of a park, etc.). The plurality of images may be captured and combined using known methods to create a 3D scene of the location. For example, images which overlap with one another may be stitched together to create a 3D model of the scene and refined using methods including bundle adjustment. In some implementations, a method including a structure from motion algorithm can be used to estimate a three-dimensional structure. In some implementations, a machine learning resource may be implemented to generate a camera-like image from any viewpoint within the location based on the captured images. For example, video flythroughs of the location may be generated by the 3D scene generator 336 based on the captured images. In some implementations, the initial 3D scene generated by the 3D scene generator 336 may be a static 3D scene which is devoid of variable or dynamic (e.g., moving) objects. For example, the initial 3D scene of a park may include imagery of the park including imagery of trees, playground equipment, picnic tables, and the like, without imagery of humans, dogs, or other moving objects.

For example, the navigation and mapping system 330 may include a 3D scene integrator 338 configured to integrate user-generated content from user-generated content data store 350 and/or machine-generated content from machine-generated content data store 360 with a 3D scene obtained from 3D scene imagery 382. For example, the integrated 3D scene imagery 384 may include 3D scenes of various locations with which media content is integrated. The 3D scenes stored in 3D scene imagery 382 may also be categorized or classified according to a time of day, a time of year, weather conditions, lighting conditions, etc. The 3D scene generated based on the plurality of images of the location may be integrated with the media content using known methods to create the integrated 3D scene imagery 384 of the location. For example, the 3D scene integrator 338 may be configured to identify and extract one or more objects (e.g., one or more dynamic objects) from an image of a scene. The image may be a user-generated image or a machine-generated image. For example, the 3D scene integrator 338 may be configured to position or place the extracted one or more objects within a 3D scene that is associated with the extracted one or more objects. For example, the 3D scene integrator 338 may select a 3D scene from 3D scene imagery 382 which corresponds to the image of the scene having the one or more objects. For example, the 3D scene integrator 338 may select a 3D scene from 3D scene imagery 382 which has the greatest degree of similarity to the image of the scene having the one or more objects (e.g., in terms of a time of day, time of year, weather conditions, lighting conditions, etc.). For example, a user-generated image taken at a park at noon in sunny conditions may include several children playing on playground equipment. The 3D scene integrator 338 may be configured to extract the children from the image using various techniques (e.g., image segmentation algorithms, machine learning resources, cropping tools, etc.). The 3D scene integrator 338 may be configured to select a 3D scene from 3D scene imagery 382 with features similar to the image (e.g., a similar time of day, time of year, sunny conditions, etc.). The 3D scene integrator 338 may be configured to position the extracted images of the children within the 3D scene to generate an updated or integrated 3D scene in which the children are placed in the scene (e.g., on a slide, on a see saw, etc.), so as to provide a user viewing the integrated 3D scene with an accurate representation of the state of the park at that time of day, as well as a sense of how the park generally feels at that time of day, for example in similar weather conditions. In some implementations, audio content may also be integrated with the 3D scene. For example, 3D scene integrator 338 may be configured to integrate sound with the 3D scene in a manner similar to integrating imagery. For example, audio recorded at the park at noon may include the laughter of children while audio recorded at the park at night may include the sound of wildlife. 3D scene integrator 338 may be configured to integrate the sound of laughter (e.g., using an actual recording taking into account privacy considerations or permissions of the user or a machine-generated audio that includes synthesized laughter) with the 3D scene which is associated with the similar timeframe of the audio. For example, the integrated 3D scene in which the children are placed in the scene (e.g., on the slide, on the see saw, etc.) and having the audio content which is played while a user views the immersive view, provides the user viewing the integrated 3D scene with an accurate representation of the state of the park at that time of day, as well as an increased sense of how the park generally feels at that time of day, for example in similar weather and noise conditions.

For example, the navigation and mapping system 330 may include a machine-generated content generator 340 having an image synthesizer 342 and an audio synthesizer 344. For example, machine-generated content stored at machine-generated content data store 360 may be generated by the machine-generated content generator 340 based on sensor data obtained by one or more sensors (forming part of external content 500) which are disposed at a location.

For example, image synthesizer 342 may generate graphical representations of dynamic objects provided in user-generated imagery stored at user-generated content data store 350. For example, image synthesizer 342 may be configured to convert the user-generated media content to a generic form to anonymize the media content (e.g., by converting a real-world image of a person positioned at a location to a two-dimensional or three-dimensional digital avatar which represents the person). For example, the sensor data obtained by the one or more sensors may indicate how many people are present at a location (e.g., based on the number of smartphones or other computing devices detected at the location). For example, the sensor data obtained by the one or more sensors may indicate various features about the people at the location (e.g., clothing, facial expressions, etc. based on an image captured by a camera, for example). For example, image synthesizer 342 may generate graphical representations of the people at the location according to the number of people and according to the features about the people at the location, to accurately represent the location and depict a vibe at the location. For example, images of a crowd in a stadium may include various persons wearing jerseys associated with the home team. Image synthesizer 342 may generate graphical representations of the people at the stadium according to the number of people at the stadium and wearing similar jerseys (as opposed to formal clothing), to accurately represent the location and depict a vibe at the location.

For example, audio synthesizer 344 may generate audio content based on a portion (e.g., granular information) of recorded user-generated audio content or other available sound to create new audio content that remains representative of the state of the location at a particular time, as well as the mood, atmosphere, vibe, or feeling of the location at a particular time (e.g., time of day, time of week, time of year, etc.).

Figure 3:
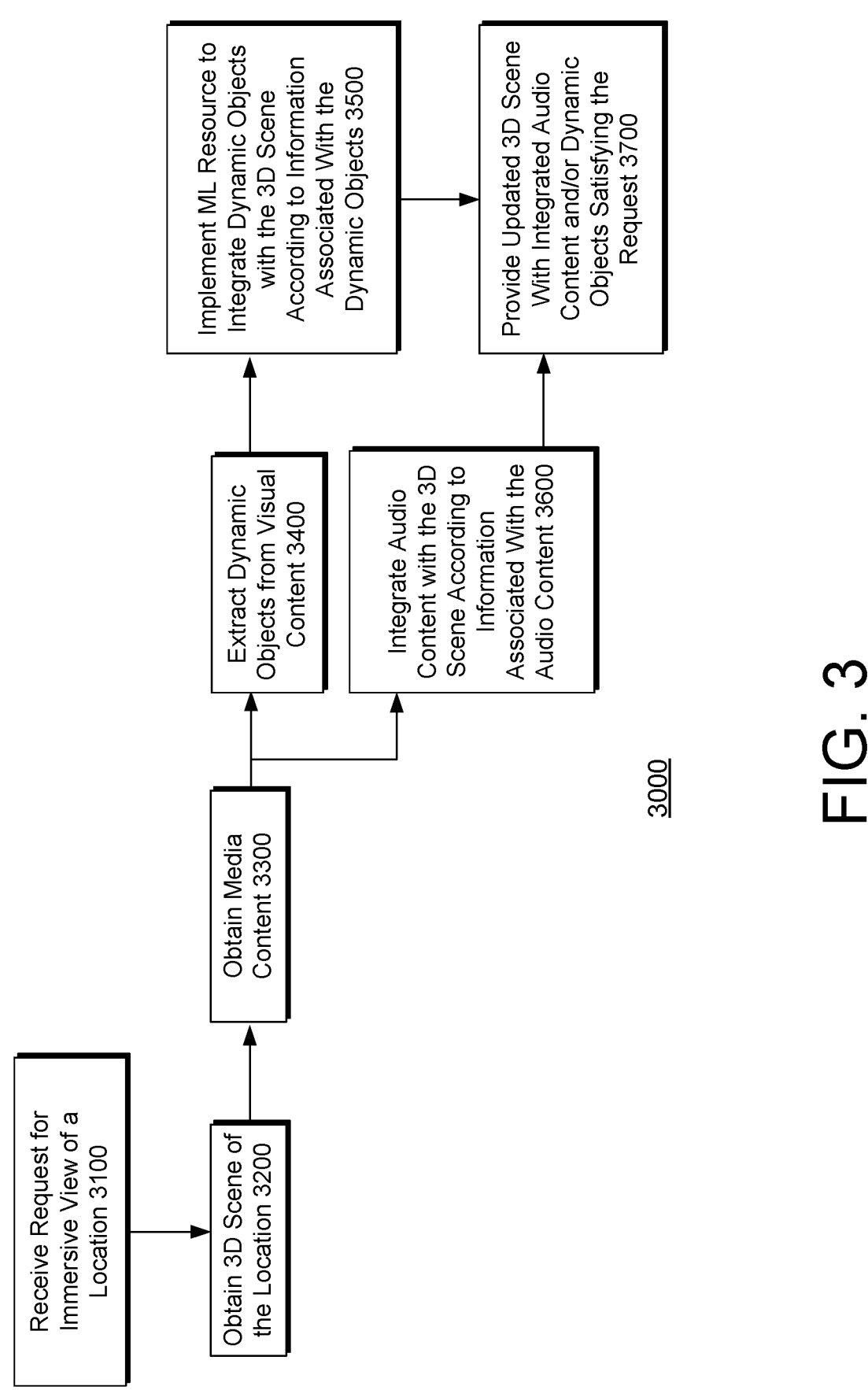
FIG. 3 illustrates a flow diagram of an example, non-limiting computer-implemented method, according to one or more example embodiments of the disclosure.

Examples of the disclosure are also directed to computer implemented methods for integrating media content with a three-dimensional scene. FIG. 3 illustrates a flow diagram of an example, non-limiting computer-implemented method, according to one or more example embodiments of the disclosure.

Referring to FIG. 3, in an example computer implemented method 3000 at operation 3100 the method includes server computing system 300 receiving a request for an immersive view of a location. For example, the request may be transmitted from computing device 100. For example, the request for the immersive view may be associated with temporal conditions (e.g., an immersive view of the location at a particular time, including a time of day, time of year, etc.) and/or other conditions including lighting conditions, weather conditions, and the like. For example, a user of computing device 100 may request an immersive view of a restaurant at 6 pm on a Friday via immersive view application 132 and the request may be transmitted to server computing system 300.

At operation 3200, the server computing system 300 may obtain a 3D scene associated with the location. For example, server computing system 300 may obtain the 3D scene from 3D scene imagery 382. For example, the 3D scene of the location obtained from 3D scene imagery 382 may be a 3D scene which corresponds to, or is roughly associated with, the conditions of the request (e.g., a 3D scene of the restaurant at 6 pm on a Friday, a 3D scene of the restaurant at night or under similar lighting conditions which are expected at a similar time of day, etc.). As another example, if a user requests an immersive view of a park when it is raining, the 3D scene of the park retrieved from 3D scene imagery 382 may be a 3D scene of the park when it is raining rather than a 3D scene of the park when it is sunny.

At operation 3300, the server computing system 300 may obtain media content associated with the location. For example, server computing system 300 may obtain the media content from user-generated content data store 350 and/or machine-generated content data store 360. For example, server computing system 300 may obtain the media content from user-generated content data store 350 and/or machine-generated content data store 360 which corresponds to, or is roughly associated with, the conditions of the request (e.g., media content captured at the restaurant at or around 6 pm on a Friday, media content captured at the restaurant at night or under similar lighting conditions which are expected at a similar time of day, etc.). As another example, if a user requests an immersive view of a park when it is raining, the retrieved media content may include imagery of the park at a time when it is raining. Likewise, retrieved media content may include audio content associated with the park captured at a time when it is raining or synthesized audio content which reflects conditions associated with rain at the park.

At operation 3400, the server computing system 300 may extract dynamic objects from visual content (i.e., imagery). For example, the 3D scene integrator 338 may be configured to identify and extract one or more objects (e.g., one or more dynamic objects) from an image of a scene of the location. Extraction of objects from captured images may be performed using various techniques (e.g., image segmentation algorithms, machine learning resources, cropping tools, etc.). Objects which are extracted may include foreground objects which are identified as being variable or dynamic objects, such objects providing an accurate representation of the state of the location at a particular time or under the particular circumstances. Further, such objects can indicate or represent a vibe or feeling of the location at a particular time or under particular circumstances.

At operation 3500, the server computing system 300 may implement a machine learning resource to integrate the objects (e.g., dynamic objects) with the 3D scene of the location according to information (e.g., temporal information) associated with the objects. For example, the 3D scene integrator 338 may be configured to integrate user-generated content from user-generated content data store 350 and/or machine-generated content from machine-generated content data store 360 with the 3D scene obtained from 3D scene imagery 382 at operation 3200. For example, the 3D scene integrator 338 may be configured to position the extracted objects within the 3D scene to generate an updated or integrated 3D scene in which the objects are placed in the scene in a manner which is consistent with how those objects were located or posed in the user-generated image of the scene. For machine-generated objects, the 3D scene integrator 338 may be configured to position the machine-generated objects within the 3D scene to generate an updated or integrated 3D scene in which the machine-generated objects are placed in the scene in a manner which is consistent with how corresponding real-world objects would most likely be located or posed in the scene, for example, using a machine learning resource which is trained to place machine-generated objects in a scene in a manner which is consistent with how corresponding real-world objects would most likely be located or are actually posed in the scene (e.g., via a neural network). The integration of the objects is intended to provide a user viewing the integrated 3D scene with an accurate representation of the state of the location at a particular time or under other specified conditions. Further, the integration of the objects may also provide a sense of how the location generally feels at a particular time (e.g., a time of day, time of year, etc.) or under other specified conditions (e.g., a particular weather condition, lighting condition, etc.).

At operation 3600, the server computing system 300 may also integrate audio content with the 3D scene of the location according to information (e.g., temporal information) associated with the scene. For example, 3D scene integrator 338 may be configured to integrate sound with the 3D scene in a manner similar to integrating imagery. For example, the 3D scene integrator 338 may be configured to integrate user-generated content from user-generated content data store 350 and/or machine-generated content from machine-generated content data store 360 with the 3D scene obtained from 3D scene imagery 382 at operation 3200. For example, the 3D scene integrator 338 may be configured to integrate audio content obtained at operation 3300 which is consistent with the request received at operation 3100 (e.g., audio content that is recorded at a similar timeframe that the immersive view request is associated with). The integration of the audio content is intended to provide a user viewing the integrated 3D scene with an even more accurate representation of the state of the location at a particular time or under other specified conditions. Further, the integration of audio content may also provide a further sense of how the location generally feels or sounds at a particular time (e.g., a time of day, time of year, etc.) or under other specified conditions (e.g., a particular weather condition, etc.).

At operation 3700, the server computing system 300 may be configured to provide the updated or integrated 3D scene of the location having the integrated audio content and/or objects (e.g., dynamic objects) which satisfies the request received at operation 3100. For example, the updated or integrated 3D scene of the location may be transmitted to the computing device 100 from the server computing system 300. For example, the updated or integrated 3D scene of the location may be stored as integrated 3D scene imagery 384.

In the example of FIG. 3, the server computing system 300 may dynamically generate the updated or integrated 3D scene of the location in response to receiving the request at operation 3100. In some implementations however, an updated or integrated 3D scene of the location which satisfies the request received at operation 3100 may be prestored or preexisting and may be stored as integrated 3D scene imagery 384. Therefore, in such a case operations 3200, 3300, 3400, 3500, and 3600 may be omitted while an operation of searching for an integrated 3D scene of the location at integrated 3D scene imagery 384 which satisfies the conditions of the request may be performed as an intermediate operation between operations 3100 and 3700. Accordingly, the responsiveness of the server computing system 300 to the request may be faster as less operations are performed or needed.

Examples of the disclosure are also directed to user-facing aspects by which a user can request an immersive view of a location. For example, FIGS. 4 through 8B illustrate example user interface screens associated with obtaining an immersive view of a location in which media content is integrated with a three-dimensional scene, according to one or more example embodiments of the disclosure.

Figure 4:
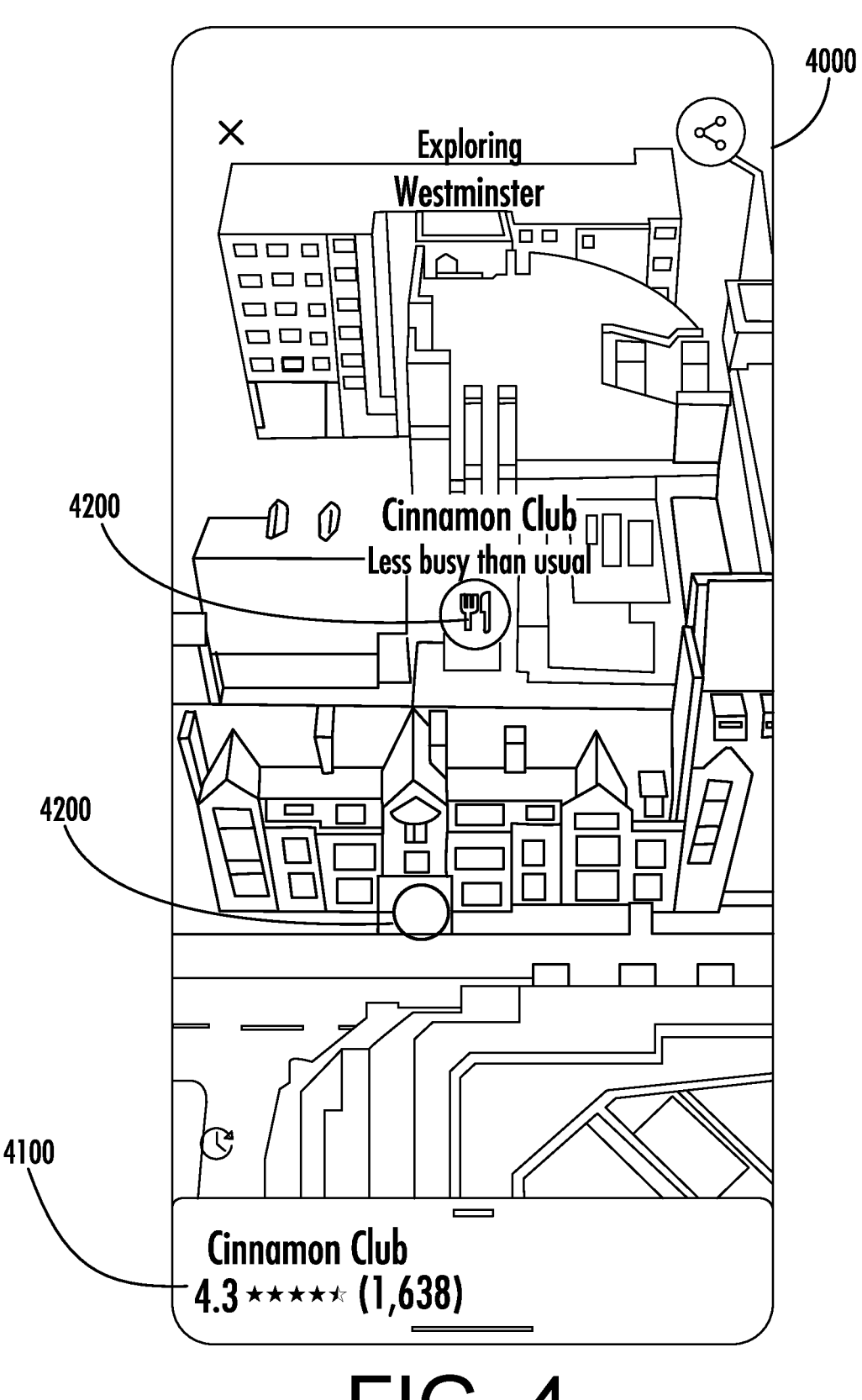
FIG. 4 illustrates a user interface screen of a mapping application, according to one or more example embodiments of the disclosure.

For example, FIG. 4 illustrates a user interface screen of a mapping application, according to one or more example embodiments of the disclosure. In FIG. 4, user interface screen 4000 indicates a user of computing device 100 is exploring the location of Westminster, particularly a building containing the Cinnamon Club 4100 where icon 4200 indicates the Cinnamon Club 4100 includes a restaurant. For example, a user interface element 4300 may enable a user to obtain an immersive view of a location. For example, user interface element 4300 may be in the form of a symbol or selectable object that is overlaid on the location to indicate to the user that an immersive view of the location can be obtained. For example, in FIG. 4 the user interface element 4300 is a white circle.

Figures 5A, 5B:
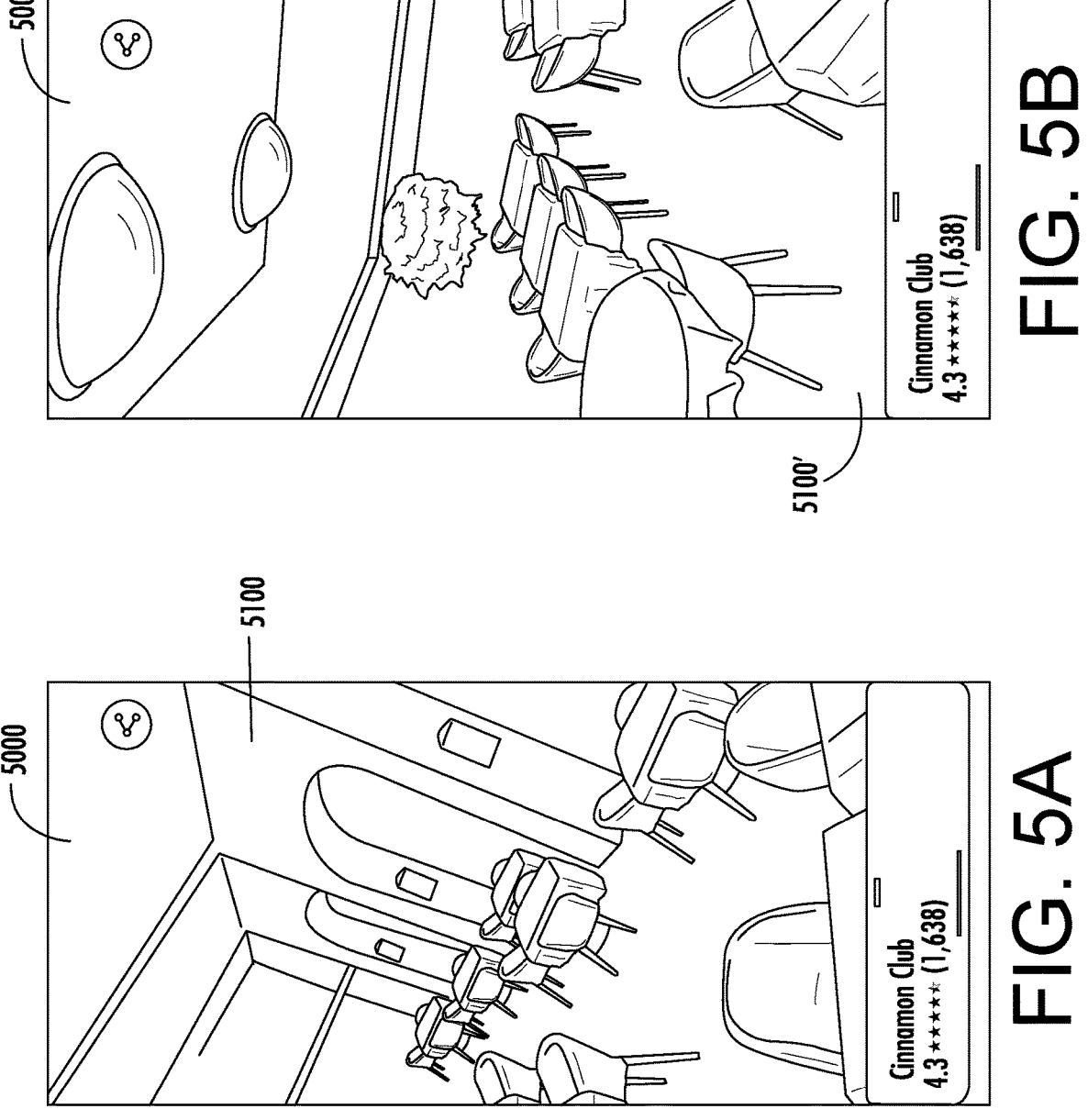
FIGS. 5A-5B illustrate example immersive views from a video flythrough of a location, according to one or more example embodiments of the disclosure.

For example, FIGS. 5A-5B illustrate example immersive views from a video flythrough of a location, according to one or more example embodiments of the disclosure. For example, FIG. 5A illustrates a first user interface screen 5000 showing a first view 5100 of the inside of the Cinnamon Club while illustrates a second user interface screen 5000' showing a second view 5100' of the inside of the Cinnamon Club. The interior views of the Cinnamon Club are example 3D scenes of a location which may be stored as 3D scene imagery 382. For example, the 3D scenes of the location may be devoid of dynamic objects (e.g., customers, staff, etc.). Therefore, 3D scenes of the location alone, or in combination and displayed as a fly through video, may not be an accurate representation of the state of the location. Further, this may not satisfactorily indicate a vibe of the restaurant, or provide any indication as to how it feels to be present in the restaurant at any particular time.

Figure 6:
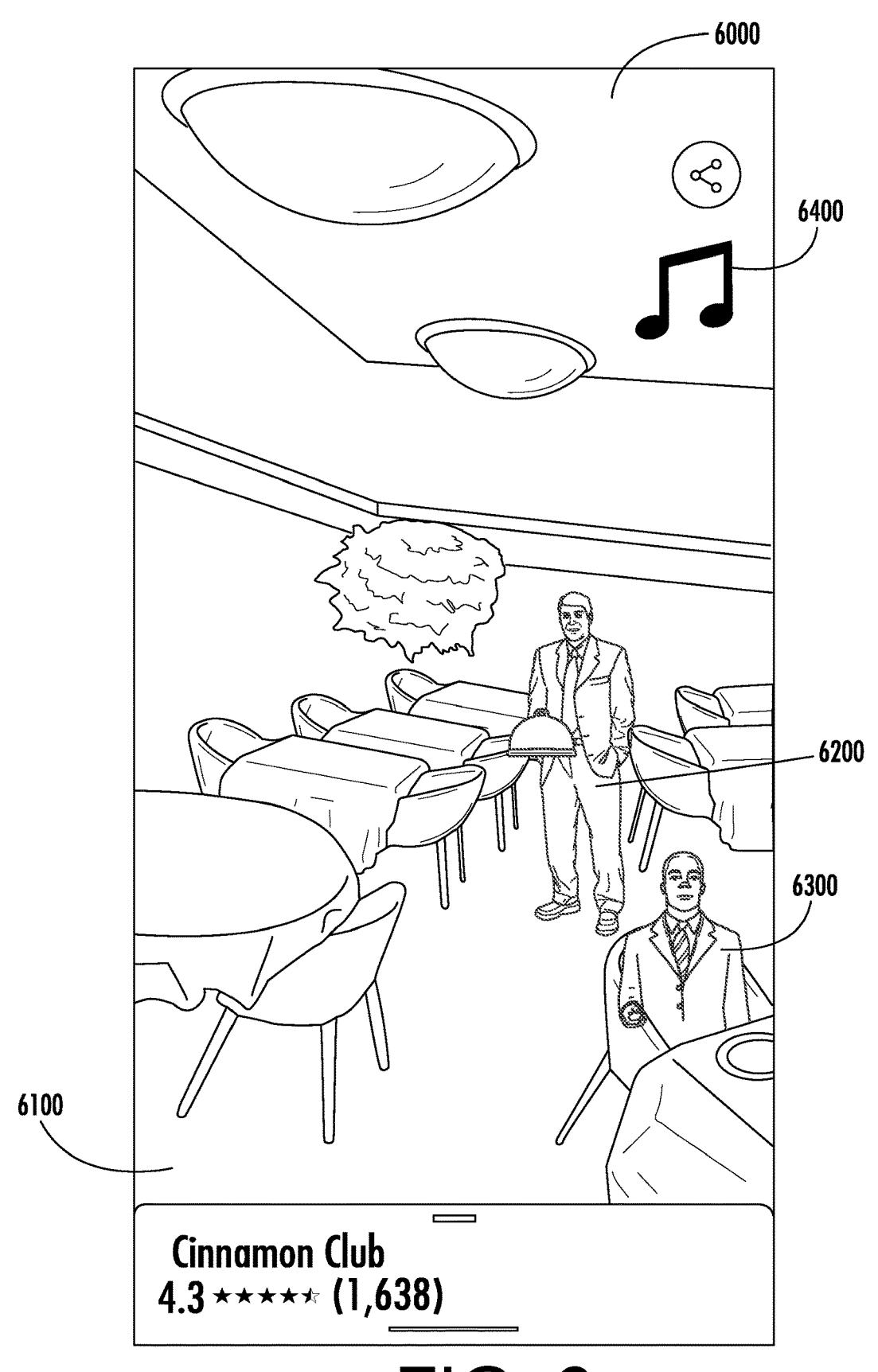
FIG. 6 illustrates an example immersive view of a location which includes an integrated 3D scene of the location, according to one or more example embodiments of the disclosure.

For example, FIG. 6 illustrates an example immersive view of a location which includes an integrated 3D scene of the location, according to one or more example embodiments of the disclosure. For example, FIG. 6 reflects the second view 5100' of the inside of the Cinnamon Club from FIG. 5B, where dynamic objects and audio content are integrated in the 3D scene of the location. For example, user interface screen 6000 illustrates a 3D scene 6100 of the location including integrated dynamic objects including a first dynamic object 6200 and a second dynamic object 6300, and integrated audio content 6400. For example, the first dynamic object 6200 may be a machine-generated graphical representation of a waiter (e.g., a 3D digital avatar which represents a waiter) and the second dynamic object 6300 may be a machine-generated graphical representation of a customer (e.g., a 3D digital avatar which represents a customer). In some implementations, the number of dynamic objects may reflect the average number of people in the restaurant at a particular time of day, day of week, time of year, etc., which may be determined from a statistical analysis of sensor data obtained from various sensors provided at the location. In some implementations, the dynamic objects may be graphical representations of real-world objects that are extracted from user-generated images which satisfy criteria associated with a request for an immersive view (e.g., captured at a time and/or under some other condition that corresponds to a time and/or the other condition associated with the request for an immersive view of the location). In some implementations, the dynamic objects may be real-world objects (which may be anonymized as needed) that are extracted from user-generated images which satisfy the criteria associated with the request for the immersive view (e.g., captured at a time and/or under some other condition that corresponds to a time and/or the other condition associated with the request for an immersive view of the location).

In some implementations, an immersive view may include a still image of the location which includes the integrated 3D scene of the location, according to one or more example embodiments of the disclosure. In some implementations, an immersive view may include a plurality of images of the location which includes the integrated 3D scene of the location, according to one or more example embodiments of the disclosure. In some implementations, an immersive view may be formed by combining together the plurality of images of the location which includes the integrated 3D scene of the location to form a moving image (e.g., a flythrough of the location), according to one or more example embodiments of the disclosure. In some implementations, the immersive view which is formed by the moving image of the integrated 3D scene of the location may include a dynamic object which moves, which further brings the integrated 3D scene of the location to life and accurately represents the state of the location at a particular time and/or under a particular condition.

With reference to FIG. 6, an immersive view of the integrated 3D scene of the location may include a still image which includes the first dynamic object 6200 and the second dynamic object 6300 integrated with the 3D scene of the location, an immersive view of the integrated 3D scene of the location which includes a plurality of images having the first dynamic object 6200 and the second dynamic object 6300 integrated with the 3D scene of the location, or an immersive view of the integrated 3D scene of the location which includes a plurality of images having the first dynamic object 6200 and the second dynamic object 6300 integrated with the 3D scene of the location where the plurality of images are combined together to form a moving image.

In some implementations, an immersive view including a plurality of images may include a dynamic object which moves (e.g., to provide a dynamic movement of a dynamic object). For example, in FIG. 6 a first image including the first dynamic object 6200 and the second dynamic object 6300 may show the first dynamic object 6200 toward the rear of the room while a second image including the first dynamic object 6200 and the second dynamic object 6300 may show the first dynamic object 6200 positioned near the second dynamic object 6300 (toward the front of the room). The immersive view of the integrated 3D scene of the location (e.g., the restaurant) which includes the plurality of images having the first dynamic object 6200 and the second dynamic object 6300 integrated with the 3D scene of the location may be formed such that the plurality of images are combined together to form the moving image where the moving image appears to show the first dynamic object 6200 dynamically moving from one part of the location to another part of the location (e.g., from the rear of the room to the front of the room). The immersive view which is formed by the moving image (i.e., a video) may be formed from a plurality of images captured by a user, from a plurality of images which are machine-generated, or a combination thereof.

In some implementations, images having a dynamic object may be generated where a position of the dynamic object may be extrapolated from other images including the dynamic object to provide a smoother, more realistic, depiction of the dynamic object moving within the scene (e.g., in the moving image, flythrough, etc.). For example, a third image including the first dynamic object 6200 and the second dynamic object 6300 at the location may be generated (e.g., via extrapolation based on the first image and the second image, time information associated with the first and second images, etc.) to show the first dynamic object 6200 in the middle of the room. For example, the immersive view of the integrated 3D scene of the location (e.g., the restaurant) which includes the plurality of images having the first dynamic object 6200 and the second dynamic object 6300 integrated with the 3D scene of the location may be formed such that the plurality of images are combined together to form the moving image where the moving image appears to show the first dynamic object 6200 dynamically moving from one part of the location to another part of the location (e.g., from the rear of the room to the middle of the room and then to the front of the room). Additional images may be generated as needed to provide a smooth movement of a dynamic object (e.g., 24 frames per second, 30 frames per second, 60 frames per second, etc.) within an immersive view of the integrated 3D scene of the location to bring the integrated 3D scene of the location to life and to accurately represent the state of the location at a particular time and/or under a particular condition.

For example, integrated audio content 6400 may be an audio recording which can be played via output device 170 when the immersive view of the location is provided to computing device 100. For example, the integrated audio content 6400 may be machine-generated or an actual recording. For example, the integrated audio content 6400 may provide an accurate representation of the state of the location at a particular time and/or under a particular condition. Further, the integrated audio content 6400 may be indicative of the mood, atmosphere, or vibe of the location at a particular time and/or under a particular condition (e.g., a weather condition). For example, the audio content that is selected may satisfy the criteria associated with the request for the immersive view (e.g., captured at a time and/or under some other condition that corresponds to a time and/or the other condition associated with the request for an immersive view of the location).

Figure 7:
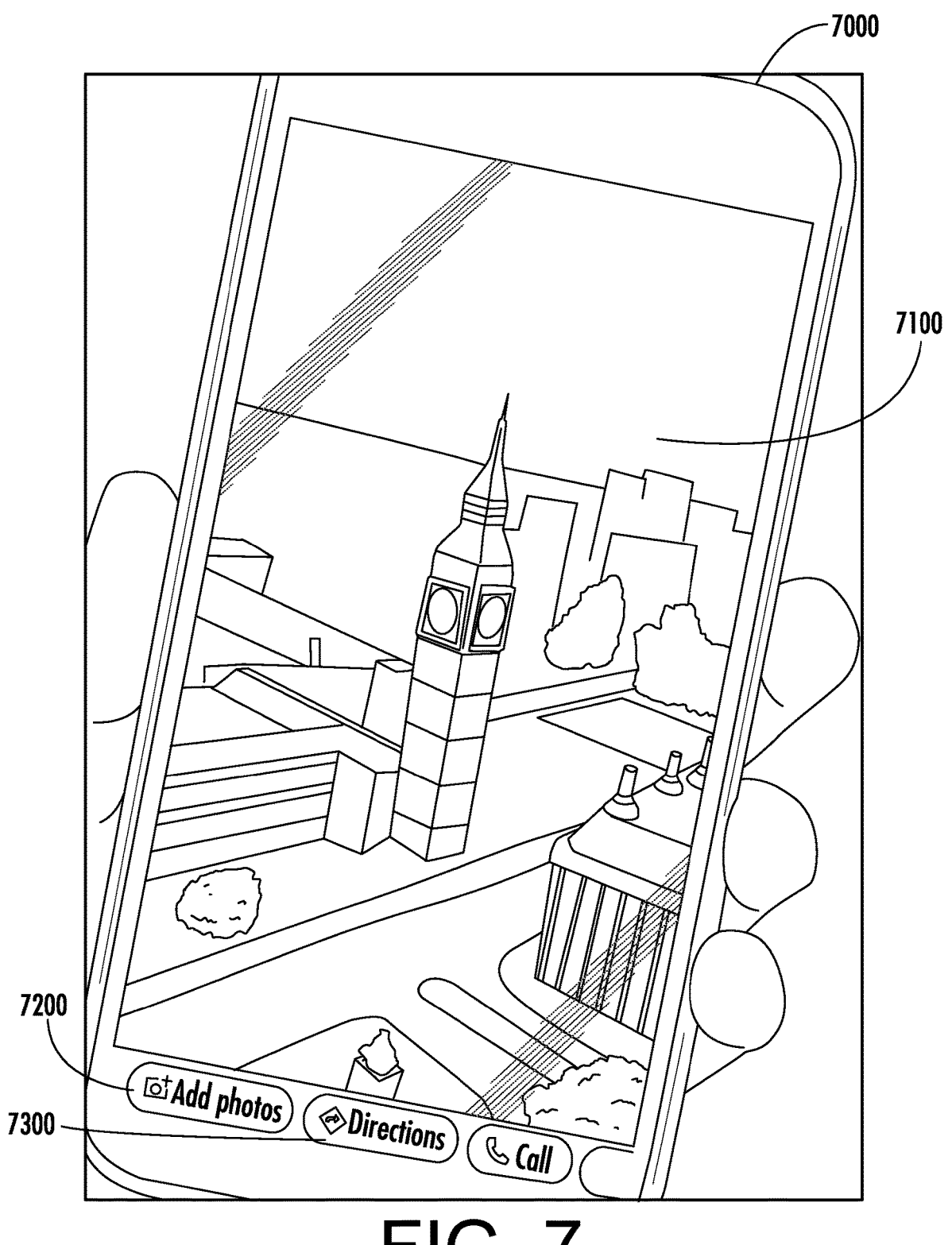
FIG. 7 illustrates an example computing device having a user interface screen which enables a user to upload user-generated content, according to one or more example embodiments of the disclosure.

For example, FIG. 7 illustrates an example computing device 7000 (corresponding to computing device 100) having a user interface screen which enables a user to upload user-generated content, according to one or more example embodiments of the disclosure. For example, FIG. 7 illustrates a user interface screen 7100 including various user interface elements including a user interface element 7200 which allows a user to add photos to one or more of the server computing system 300, user-generated content data store 350, machine-generated content data store 360, POI data store 370, navigation data store 380, and user data store 390, for example, via immersive view application 132 and network 400. For example, user interface element 7300 may be selectable for a user to obtain directions to a location, for example, via the navigation application 134.

In some implementations, when user interface element 7200 is selected the image capturer 182 is activated for a user to capture images of a location. In some implementations, when user interface element 7200 is selected a user can select photos stored locally at the computing device 7000 or stored remotely, for uploading to one or more of the server computing system 300, user-generated content data store 350, machine-generated content data store 360, POI data store 370, navigation data store 380, and user data store 390, for example, via immersive view application 132 and network 400.

Though not shown in FIG. 7, other user interface elements may be provided. For example, a user interface element for adding audio content may also be provided. In some implementations, when a user interface element for adding audio content is selected the sound capturer 184 is activated for a user to capture (record) sound at a location. In some implementations, when the user interface element for adding audio content is selected a user can select recordings stored locally at the computing device 7000 or stored remotely, for uploading to one or more of the server computing system 300, user-generated content data store 350, machine-generated content data store 360, POI data store 370, navigation data store 380, and user data store 390, for example, via immersive view application 132 and network 400.

The media content which is uploaded to one or more of the server computing system 300, user-generated content data store 350, machine-generated content data store 360, POI data store 370, navigation data store 380, and user data store 390, may include various information about the media content.

For example, the media content captured by the camera (e.g., image capturer 182) may include imagery of the location and various information (e.g., metadata, semantic data, etc.) which is useful for integrating the imagery (or portions of the imagery) in a 3D scene of a location associated with the imagery. For example, an image may include information including a date the image was captured, a time of day the image was captured, and location information indicating the location where the image was taken (e.g., a GPS location), etc. For example, descriptive metadata may be provided with the image and may include keywords relating to the image, a title or name of the image, environmental information at the time the image was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device 7000 used to capture the image or from another computing device.

For example, the media content captured by a microphone (e.g., sound capturer 184) may include audio associated with a location. The audio content may include various information (e.g., metadata, semantic data, etc.) which is useful for integrating the audio content (or portions of the audio) with a 3D scene of a location associated with the audio content. For example, the audio content may include information including a date the audio was captured, a time of day the audio was captured, the audio type, and location information indicating the location where the audio was captured (e.g., a GPS location), etc. For example, descriptive metadata may be provided with the audio and may include keywords relating to the audio, a title or name of the audio, a music genre of the audio, environmental information at the time the audio was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device 7000 used to capture the audio or from another computing device.

Figure 8A:
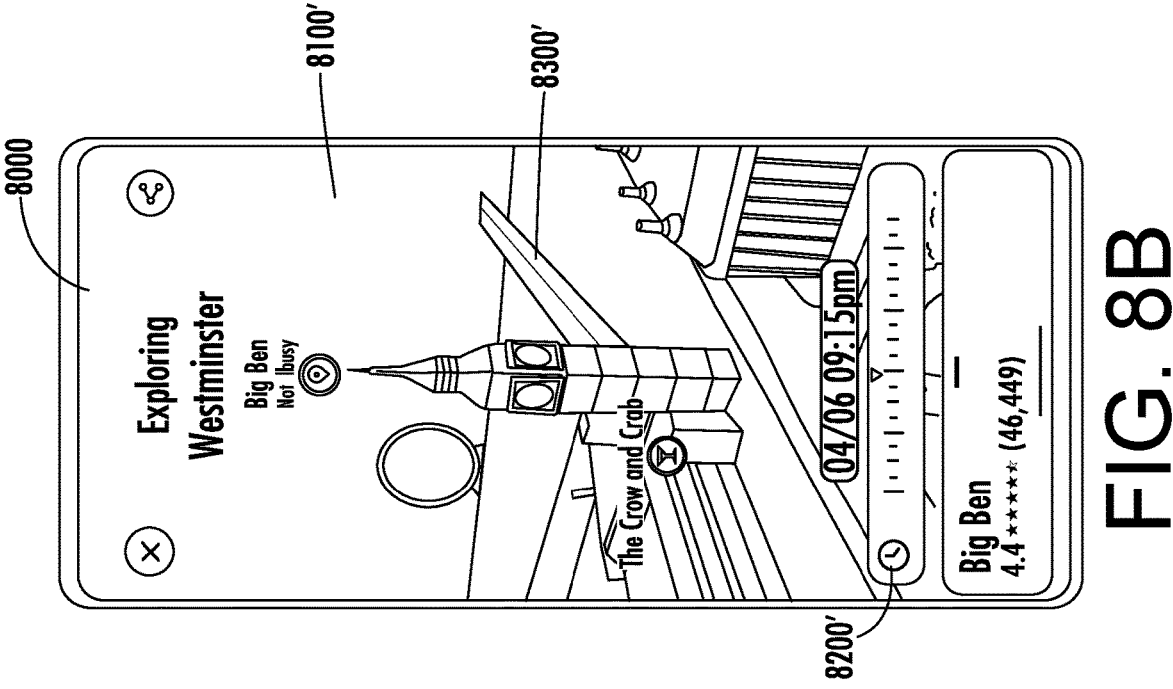
FIGS. 8A-8B illustrate example user interface screens by which a user can request immersive views of a location associated with particular times, according to one or more example embodiments of the disclosure.
Figure 8B:
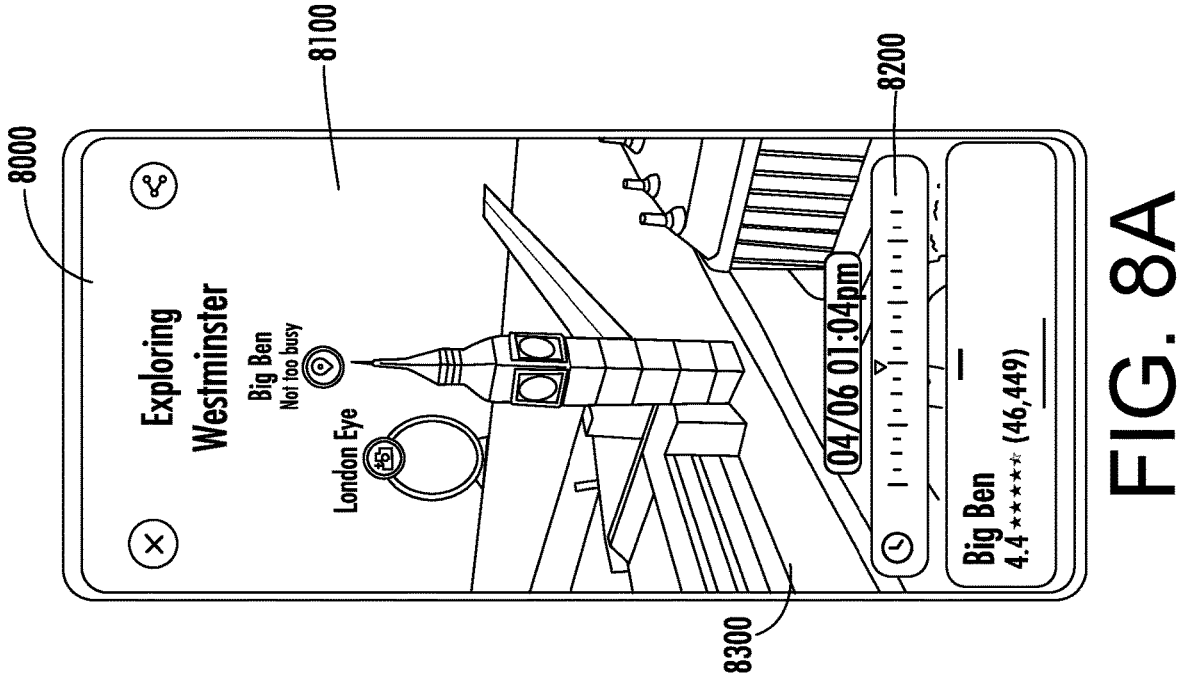

For example, FIGS. 8A-8B illustrate example user interface screens by which a user can request an immersive view of a location which is associated with a particular time, according to one or more example embodiments of the disclosure. For example, FIG. 8A illustrates a computing device 8000 which displays a user interface screen 8100 including various user interface elements including a user interface element 8200 which corresponds to a time slider widget which allows a user to request an immersive view of a location at various times of the day. For example, FIG. 8B illustrates the computing device 8000 which displays a user interface screen 8100' including various user interface elements including a user interface element 8200' which corresponds to a time slider widget which allows the user to request an immersive view of a location at various times of the day.

For example, user interface screen 8100 displays an immersive view of Westminster at 1:04 pm while user interface screen 8100' displays an immersive view of Westminster at 9:15 pm. For example, the immersive view shown in FIG. 8A reflects accurate lighting conditions for that time of day and dynamic objects may include vehicles 8300 which are integrated with a 3D scene of the location. For example, the immersive view shown in FIG. 8B reflects accurate lighting conditions for that time of day and dynamic objects may include vehicles 8300' having their headlights turned on which are integrated with a 3D scene of the location.

Though not shown in FIGS. 8A-8B, other user interface elements may be provided by which a user can specify a request to obtain an immersive view of a location according to various conditions to accurately obtain a representation of the state of the location according to those conditions. Further, this may allow a user to accurately obtain a vibe of the location according to those conditions. For example, a user interface element for identifying a weather condition (e.g., a sunset view, a sunrise view, under sunny, cloudy, or rainy conditions, etc.) may be provided. For example, a user of the computing device 100 may request an immersive view of a park in the evening when it is raining. The user interface element to specify a weather condition (or any condition associated with the requested immersive view) may be in the form of a pull-down menu, a selectable user interface element, a text box, and the like. For example, a user interface element for specifying a crowd condition (e.g., not crowded, slightly crowded, crowded, very crowded, etc.) may be provided. For example, a user of the computing device 100 may request an immersive view of a park when it is considered to be very busy so that the user can appreciate the vibe of the park when it is very crowded without actually traveling to the park. The integrated 3D scene of the park may include imagery of the park with a high level of visitors and/or audio content which reflects a very noisy environment indicative of a very crowded park. For example, a user interface element for specifying a lighting condition (e.g., normal ambient light, bright, dark, etc.) may be provided. For example, a user of the computing device 100 may request an immersive view of a park when it is considered to be very bright so that the user can appreciate the ambiance of the park when it is very bright without actually traveling to the park. The integrated 3D scene of the park may include imagery of the park with integrated images that are indicative of the park under bright conditions. The user may also specify a time of day in addition to or instead of a brightness level, when requesting the immersive view.

Examples of the disclosure are also directed to computer implemented methods for integrating media content with a three-dimensional scene. FIG. 9 illustrates a flow diagram of an example, non-limiting computer-implemented method, according to one or more example embodiments of the disclosure.

Referring to FIG. 9, in an example computer implemented method 9000 at operation 9100 the method includes computing device 100 receiving a request a first input (e.g., via the input device 150) for a first immersive view of a location which represents a first state of the location at a first time. For example, the first input may be provided via a selection of a user interface element (e.g., user interface element 8200 as shown in FIG. 8A) provided on a user interface screen. For example, the first input may indicate a request for a first immersive view of a location which represents how the location feels at a particular time (e.g., how Westminster feels at around 1 pm in April).

At operation 9200 the method includes computing device 100 providing, for presentation on the display device 160, the first immersive view of the location which includes: a 3D scene of the location which is generated based on a plurality of images, and first media content integrated with the 3D scene of the location. For example, the first media content is representative of the first state of the location at the first time. For example, in FIG. 8A the computing device 100 provides the first immersive view of Westminster where first media content may include dynamic objects including vehicles 8300.

At operation 9300 the method includes computing device 100 receiving a request a second input (e.g., via the input device 150) for a second immersive view of the location which represents a second state of the location at a second time. For example, the second input may be provided via a selection of a user interface element (e.g., user interface element 8200' as shown in FIG. 8B) provided on a user interface screen. For example, the second input may indicate a request for a second immersive view of a location which accurately represents the state of the location at another particular time. Further, such a second immersive view may represent how the location feels at the another particular time (e.g., how Westminster feels at around 9 pm in April).

At operation 9400 the method includes computing device 100 providing, for presentation on the display device 160, the second immersive view of the location which includes: the 3D scene of the location which is generated based on the plurality of images, and second media content integrated with the 3D scene of the location. For example, the second media content is representative of the second state of the location at the second time. For example, in FIG. 8B the computing device 100 provides the second immersive view of Westminster where second media content may include dynamic objects including vehicles 8300' having their headlights on.

As already described herein, the first media content may include user-generated media content captured by one or more users, machine-generated media content, or combinations thereof. The user-generated media content may include user-generated visual content, user-generated audio content, or combinations thereof. The machine-generated media content may include machine-generated visual content, machine-generated audio content, or combinations thereof.

In some implementations, the computing device 100 may transmit user-generated media content to the server computing system 300 or another database (e.g., user-generated content data store 350, machine-generated content data store 360, POI data store 370, navigation data store 380, and user data store 390, etc.). As a result of updating data stores with additional media content, future virtual renderings of locations associated with the user-generated content may be updated or include the user-generated media content added by a user via the computing device 100.

For example, a method implemented by the computing device 100 may include receiving a third input, via the input device 150, providing user-generated media content captured by a user of the computing device 100, the user-generated media content being temporally associated with the first time (e.g., an image of Westminster captured at around 1 pm in April, or at around 1 pm, etc.). The method may further include transmitting the user-generated media content to server computing system 300 which is configured to provide the first immersive view of the location which represents the first state of the location at the first time or to another computing device including a database (e.g., user-generated content data store 350, machine-generated content data store 360, POI data store 370, navigation data store 380, and user data store 390, etc.). The method may further include receiving a fourth input via the input device 150 requesting the first immersive view of the location which represents the first state of the location at the first time, and providing, for presentation on the display device 160, the first immersive view of the location which includes: the 3D scene of the location generated based on the plurality of images, and updated first media content integrated with the 3D scene of the location, the updated first media content being representative of the first state of the location at the first time and including at least a portion of the user-generated media content captured by the user of the computing device 100. That is, the integrated 3D scene associated with a location at a particular time, may be updated based on subsequent media content captured by the computing device 100 which is associated with the location at the particular time. Therefore, an accurate representation of a state of a location can be kept updated as time progresses based on recent experiences and media content captured by users at the location. Further, a vibe or feeling of a location can be kept updated as time progresses based on recent experiences and media content captured by users at the location.

To the extent alleged generic terms including "module", and "unit," and the like are used herein, these terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A method, comprising:

obtaining a first three-dimensional (3D) scene of a location which is generated based on a plurality of images;

receiving first media content temporally associated with the location, wherein the first media content comprises first machine-generated media content that is synthesized based on sensor data obtained by one or more sensors disposed at the location by:

determining, based on the sensor data obtained by the one or more sensors, a number of objects at the location at a first time, determining, based on the sensor data obtained by the one or more sensors, features about the objects at the location at the first time, and generating first graphical representations of the objects at the location according to the number of objects and according to the features about the objects at the location at the first time, to indicate a state of the location at the first time;

integrating at least a portion of the first media content with the first 3D scene of the location to obtain an integrated 3D scene of the location by determining one or more positions within the first 3D scene to place the first graphical representations of the objects; and providing the integrated 3D scene of the location to represent the state of the location at the first time based on the first media content including the first machine-generated media content being temporally associated with the location.

2. The method of claim 1, wherein the first media content further comprises user-generated media content captured by one or more users.

3. The method of claim 2, wherein the user-generated media content comprises at least one of user-generated visual content or user-generated audio content.

4. The method of claim 2, wherein the user-generated media content includes imagery of the location including one or more real-world dynamic objects, and integrating the at least the portion of the first media content with the first 3D scene of the location includes extracting the one or more real-world dynamic objects from the imagery of the location and determining one or more positions within the first 3D scene to place the one or more real-world dynamic objects.

5. The method of claim 4, wherein the imagery of the location including the one or more real-world dynamic objects includes first imagery of the location including a first portion of the one or more real-world dynamic objects captured at the location by the one or more users at the first time and second imagery of the location including a second portion of the one or more real-world dynamic objects captured at the location by the one or more users at a second time, and providing the integrated 3D scene of the location comprises:
  providing a first integrated 3D scene of the location, associated with the first time, having the first portion of the one or more real-world dynamic objects, and
  providing a second integrated 3D scene of the location, associated with the second time, having the second portion of the one or more real-world dynamic objects.

6. The method of claim 2, wherein the user-generated media content includes first audio captured at the location by the one or more users at the first time and second audio captured at the location by the one or more users at a second time, and
  providing the integrated 3D scene of the location comprises:
    providing a first integrated 3D scene of the location, associated with the first time, having the first audio, and
    providing a second integrated 3D scene of the location, associated with the second time, having the second audio.

7. The method of claim 1, wherein the first media content further comprises second machine-generated media content generated by converting user-generated media content to a generic form that anonymizes the user-generated media content.

8. The method of claim 7, wherein the second machine-generated media content comprises at least one of machine-generated visual content or machine-generated audio content.

9. The method of claim 1, wherein the first media content further comprises second machine-generated media content that is synthesized based on user-generated media content captured by one or more users.

10. The method of claim 9, wherein
  the user-generated media content includes imagery of the location including one or more real-world dynamic objects, and the method further comprises:
    extracting the one or more real-world dynamic objects from the imagery; and
    converting the one or more real-world dynamic objects into corresponding second graphical representations of the one or more real-world dynamic objects, and
    integrating the at least the portion of the first media content with the first 3D scene of the location includes determining one or more positions within the first 3D scene to place the corresponding second graphical representations of the one or more real-world dynamic objects.

11. The method of claim 10, wherein
  the one or more real-world dynamic objects include one or more humans, and
  the corresponding second graphical representations of the one or more real-world dynamic objects include corresponding 3D digital avatars of the one or more humans.

12. The method of claim 10, wherein
  the imagery of the location including the one or more real-world dynamic objects includes first imagery of the location including a first portion of the one or more real-world dynamic objects captured at the location by the one or more users at the first time and second imagery of the location including a second portion of the one or more real-world dynamic objects captured at the location by the one or more users at a second time, and providing the integrated 3D scene of the location comprises:
  providing a first integrated 3D scene of the location, associated with the first time,
    having a first portion of the second graphical representations corresponding to the first portion of the one or more real-world dynamic objects, and
    providing a second integrated 3D scene of the location, associated with the second time, having a second portion of the second graphical representations corresponding to the second portion of the one or more real-world dynamic objects.

13. The method of claim 9, wherein
  the user-generated media content includes first audio captured at the location by the one or more users at the first time and second audio captured at the location by the one or more users at a second time, and the method further comprises:
    obtaining the second machine-generated media by synthesizing a first synthesized audio recording based on the first audio and synthesizing a second synthesized audio recording based on the second audio, and
    providing the integrated 3D scene of the location comprises:
      providing a first integrated 3D scene of the location, associated with the first time, having the first synthesized audio recording, and
      providing a second integrated 3D scene of the location, associated with the second time, having the second synthesized audio recording.

14. The method of claim 1, wherein determining the one or more positions within the first 3D scene to place the first graphical representations of the objects comprises using one or more machine-learned models to determine suitable positions within the first 3D scene to place the first graphical representations of the objects.

15. The method of claim 1, wherein the objects are people.

16. A computing device, comprising:
  at least one memory to store instructions; and
  at least one processor configured to execute the instructions to perform the method of claim 1.

17. A non-transitory computer readable medium storing instructions which, when executed by one or more processors, cause the one or more processors to perform the method of claim 1.

18. A computing device, comprising:
  a input device;
  a display device;
  at least one memory to store instructions; and
  at least one processor configured to execute the instructions to perform operations, the operations comprising:
    receiving a first input via the input device requesting a first immersive view of a location which represents a first state of the location at a first time,
    providing, for presentation on the display device, the first immersive view of the location which includes:
      a three-dimensional (3D) scene of the location which is generated based on a plurality of images, and
      first media content integrated with the 3D scene of the location, the first media content being representative of the first state of the location at the first time, wherein the first media content comprises first machine-generated media content that has been synthesized based on first sensor data obtained by one or more first sensors disposed at the location by:

determining, based on the first sensor data obtained by the one or more first sensors, a number of first objects at the location at the first time, determining, based on the first sensor data obtained by the one or more first sensors, features about the first objects at the location at the first time, and generating first graphical representations of the first objects at the location according to the number of first objects and according to the features about the first objects at the location at the first time, to indicate the first state of the location at the first time, receiving a second input via the input device requesting a second immersive view of the location which represents a second state of the location at a second time, providing, for presentation on the display device, the second immersive view of the location which includes:

the 3D scene of the location generated based on the plurality of images, and second media content integrated with the 3D scene of the location, the second media content being representative of the second state of the location at the second time, wherein the second media content comprises second machine-generated media content that has been synthesized based on second sensor data obtained by one or more second sensors disposed at the location by:

determining, based on the second sensor data obtained by the one or more second sensors, a number of second objects at the location at the second time, determining, based on the second sensor data obtained by the one or more second sensors, features about the second objects at the location at the second time, and generating second graphical representations of the second objects at the location according to the number of second objects and according to the features about the second objects at the location at the second time, to indicate the second state of the location at the second time.

19. The computing device of claim 18, wherein the first media content further comprises user-generated media content captured by one or more users, and the user-generated media content comprises at least one of user-generated visual content or user-generated audio content.

20. The computing device of claim 18, wherein the operations further comprise:

receiving a third input, via the input device, providing user-generated media content captured by a user of the computing device, the user-generated media content being temporally associated with the first time, transmitting the user-generated media content to at least one of a server computing system configured to provide the first immersive view of the location which represents the first state of the location at the first time or a database, and providing, for presentation on the display device, an updated first immersive view of the location which includes:

the 3D scene of the location generated based on the plurality of images, and updated first media content integrated with the 3D scene of the location, the updated first media content being representative of the first state of the location at the first time and comprising the first machine-generated media content and at least a portion of the user-generated media content captured by the user of the computing device.

21. A server computing system, comprising:

at least one memory to store instructions; and at least one processor configured to execute the instructions to perform operations, the operations comprising:

obtaining a first three-dimensional (3D) scene of a location which is generated based on a plurality of images, receiving first media content temporally associated with the location, wherein the first media content comprises first machine-generated media content that is synthesized based on sensor data obtained by one or more sensors disposed at the location by:

determining, based on the sensor data obtained by the one or more sensors, a number of objects at the location at a first time, determining, based on the sensor data obtained by the one or more sensors, features about the objects at the location at the first time, and generating first graphical representations of the objects at the location according to the number of objects and according to the features about the objects at the location at the first time, to indicate a state of the location at the first time;

integrating at least a portion of the first media content with the first 3D scene of the location to provide an integrated 3D scene of the location by determining one or more positions within the first 3D scene to place the first graphical representations of the objects, and providing the integrated 3D scene of the location to represent the state of the location at the first time based on the first media content including the first machine-generated media content being temporally associated with the location.

22. The server computing system of claim 21, wherein the first media content further comprises user-generated media content captured by one or more users, and the user-generated media content comprises at least one of user-generated visual content or user-generated audio content.

* * * * *